US012253159B2

(12) United States Patent
White et al.

(10) Patent No.: US 12,253,159 B2
(45) Date of Patent: Mar. 18, 2025

(54) MAGNETICALLY-ASSISTED MECHANICAL GEAR SYSTEM AND METHOD

(71) Applicant: Kaney Aerospace, Inc., Rockford, IL (US)

(72) Inventors: Adam Michael White, Beavercreek, OH (US); Joseph Michael Stock, Fairborn, OH (US); Joshua Max Jones, Dayton, OH (US); Waleed Said, Rockford, IL (US); Nicholas Shaun Palmer, Dayton, OH (US); David George Kloos, Dayton, OH (US)

(73) Assignee: Kaney Aerospace, Inc., Rockford, IL (US)

( * ) Notice: Subject to any disclaimer, the term of this patent is extended or adjusted under 35 U.S.C. 154(b) by 175 days.

(21) Appl. No.: 17/899,841

(22) Filed: Aug. 31, 2022

(65) Prior Publication Data
US 2024/0068558 A1 Feb. 29, 2024

(51) Int. Cl.
*F16H 57/12* (2006.01)
*F16H 1/06* (2006.01)
*F16H 1/14* (2006.01)
*F16H 1/16* (2006.01)
*F16H 1/20* (2006.01)
*F16H 25/20* (2006.01)

(52) U.S. Cl.
CPC ............... *F16H 57/12* (2013.01); *F16H 1/06* (2013.01); *F16H 1/14* (2013.01); *F16H 1/16* (2013.01); *F16H 1/206* (2013.01); *F16H 25/2003* (2013.01); *F16H 2057/123* (2013.01)

(58) Field of Classification Search
CPC ......... F16H 57/12; F16H 13/12; F16H 49/005
See application file for complete search history.

(56) References Cited

FOREIGN PATENT DOCUMENTS

| CN | 110094483 A | * | 8/2019 | ............ F16H 49/005 |
| CN | 114060269 A | * | 2/2022 | .......... F04C 18/0215 |
| CN | 114944740 A | * | 8/2022 | |
| DE | 102009056227 A1 | * | 6/2011 | ............ H02K 49/102 |

(Continued)

OTHER PUBLICATIONS

J. Bondhus, "Backlash (engineering)," wikipedia article, Apr. 10, 2021, https://en.wikipedia.org/w/index.php?title=Backlash_(engineering)&oldid=1016960274 (5 pages).

*Primary Examiner* — Bobby Rushing, Jr.
(74) *Attorney, Agent, or Firm* — Amundsen Davis, LLC

(57) ABSTRACT

Magnetically-assisted mechanical gear systems and other power transmission systems, and related methods of operation and assembly, are disclosed herein. In an example embodiment, such a system includes a driving gear, a driven gear, and a first magnetomotive force (MMF) source that generates a magnetic flux. A first portion of the flux is communicated between at least one driving gear teeth and at least one driven gear teeth so that one or more magnetic forces are exerted between the gears. When the first rotational movement of the driving gear alternates from being in the first rotational direction to being in a third rotational direction opposite the first rotational direction, then the driven gear is driven by the one or more magnetic forces so that the second rotational movement also alternates, and a first amount of backlash movement between the driving and driven gears is avoided or reduced.

40 Claims, 10 Drawing Sheets

(56) References Cited

FOREIGN PATENT DOCUMENTS

| JP | H0473454 A | | 3/1992 | |
|---|---|---|---|---|
| JP | H04175556 A | * | 6/1992 | ............. F16H 49/00 |
| JP | 2020148324 A | * | 9/2020 | .......... B25J 17/0258 |
| JP | 2022012806 A | * | 1/2022 | |
| KR | 101720540 B1 | * | 3/2017 | ............. F16H 57/00 |

* cited by examiner

MAGNETICALLY-ASSISTED MECHANICAL GEAR SYSTEM AND METHOD

STATEMENT REGARDING FEDERALLY SPONSORED RESEARCH OR DEVELOPMENT

-

CROSS-REFERENCE TO RELATED APPLICATIONS

-

FIELD OF THE INVENTION

The present invention relates to mechanical gear assemblies, systems, and methods and, more particularly to magnetically-assisted mechanical gear assemblies, systems, and methods that are designed to eliminate or reduce backlash among gears during operation of such systems and methods.

BACKGROUND OF THE INVENTION

Mechanical gear assemblies, systems, and methods are employed in a wide variety of applications in order to transmit motion from rotating power sources to other devices. Often, a mechanical gear assembly operates to communicate, for receipt by another device, output speed and output torque that are different from input speed and input torque that are received from a rotating power source.

A concern that exists in regard to the operation of many conventional mechanical gear assemblies, systems, and methods relates to backlash that can occur between interfacing gears. A pair of interfacing gears will typically include at any given time a driven gear and a driving gear that imparts force/torque to the driven gear due to contact between the two gears. As the driving gear rotates and causes the driven gear to rotate in response thereto, respective driving contact surfaces of successive ones of respective driving gear teeth of the driving gear come into contact with respective driven contact surfaces of successive ones of respective driven gear teeth of the driven gear. However, at any given time when a respective driving contact surface of a respective one of the driving gear teeth is in contact with a respective driven contact surface of a respective one of the driven gear teeth, there typically will be a respective gap or space between a respective oppositely-directed surface of that one driving gear tooth and a successive one of the driven gear teeth that is situated on the other side of that one driving gear tooth.

Because of such a gap, if the direction of rotation of the driving gear is reversed, there will be a delay in the transmission of rotational power from the driving gear to the driven gear as the driving gear rotates sufficiently so that the respective oppositely-directed surface of that one driving gear tooth comes into contact with a contact surface of that successive one of the driven gear teeth. The distance that the driving gear travels (or angle through which it rotates) in order to eliminate this gap, so that contact is reestablished between the driving gear and the driven gear after the direction of rotation of the driving gear has been reversed, can be understood to constitute the backlash of the interfacing gears. Such backlash is the source of possible backlash movement, in which the driving gear rotates relative to the driven gear without causing corresponding movement of the driven gear. Further, although the cause of the backlash phenomenon can in some circumstances be understood as a reversal of direction of rotation of the driving gear, it may also be caused by a reversing torque being applied to the driven gear delaying back-driven transmission of rotation power from the (initially) driven gear to the (initially) driving gear.

Although in some circumstances backlash movement is innocuous, in many operational circumstance backlash movement is undesirable because, among other things, it can result in delays between when switches in the direction of rotation are commanded and when such switches produce desired rotational output. Also, such backlash can lead to the introduction of errors in output rotation relative to input rotation. Further, when a driven output is not steady due to backlash, a system may have uncontrolled movements that can lead to an unstable system.

For at least one or more of these reasons, or one or more other reasons, it would be advantageous if new or improved gear assemblies, systems, and methods, and/or other assemblies, systems, and methods for power transmission, could be developed, so as to eliminate or reduce backlash and associated backlash movement and to address any one or more of the concerns discussed above or one or more other concerns, or to provide one or more benefits.

SUMMARY

In at least one example embodiment, the present disclosure relates to a magnetically-assisted mechanical power transmission system. The system includes a first component having first formations arranged along the first component, and a second component having second formations arranged along the second component, where one of the first component and the second component is a first rotating component. The system also includes a first magnetomotive force (MMF) source that generates a first magnetic flux, where the first MMF source either is at least indirectly supported in relation to, or is formed as part of, one or both of the first component and second component. The first component is in contact with or in proximity to the second component so that, in response to a first movement of the first component in a first direction, the second component is driven to undergo a second movement in a second direction. At least a first portion of the first magnetic flux is communicated between at least one of the first formations of the first component and at least one of the second formations of the second component so that one or more magnetic forces are exerted between the first component and the second component. If the first movement of the first component is changed from being in the first direction to being in a third direction opposite the first direction, then the second component is driven by the one or more magnetic forces so that the second movement is changed from being in the second direction to being in a fourth direction opposite the second direction. A first amount of backlash movement between the first component and the second component is avoided or reduced due to the one or more magnetic forces.

Further, in at least one example embodiment, the present disclosure relates to a magnetically-assisted mechanical gear system. The system includes a driving gear having driving gear teeth, a driven gear having driven gear teeth, and a first magnetomotive force (MMF) source that generates a first magnetic flux, where the first MMF source either is at least indirectly supported in relation to, or is formed as part of, one or both of the driving and driven gears. The driving gear and driven gear are arranged so that the driving gear teeth mesh with the driven gear teeth such that, in response to a first rotational movement of the driving gear in a first direction, the driven gear is driven to experience a second rotational movement in a second rotational direction. At least a first portion of the first magnetic flux is communicated between at least one of the driving gear teeth and at least one of the driven gear teeth so that one or more magnetic forces are exerted between the driving and driven gears. When the first rotational movement of the driving gear alternates from being in the first rotational direction to being in a third rotational direction opposite the first rotational direction, then the driven gear is driven by the one or more magnetic forces so that the second rotational movement also alternates from being in the second rotational direction to being in a fourth rotational direction opposite the second rotational direction, and a first amount of backlash movement between the driving and driven gears is avoided or reduced due to the one or more magnetic forces.

Additionally, in at least one example embodiment, the present disclosure relates to a method of transmitting mechanical power in a magnetically-assisted manner. The method includes providing a transmission system including a first component having first formations, a second component having second formations, and a magnetomotive force (MMF) source that either is supported at least indirectly in relation to, or is formed as part of, the first and second components. The method also includes generating a first magnetic flux by way of the first MMF source, where the magnetic flux is communicated between at least one of the first formations of the first component and at least one of the second formations of the second component so that one or more magnetic forces are exerted between the first component and the second component. Additionally, the method includes moving the first component in a first direction so as to mechanically force the second component to move in a second direction due to mechanical contacts between first surfaces of the first formations, respectively, and first surfaces of the second formations, respectively. Further, the method includes moving the first component in a third direction opposite to the first direction where, when the first component is moved in the third direction, then the second component is driven by the one or more magnetic forces so that further movement of the second component is in a fourth direction opposite the second direction, and a first amount of backlash movement between the first component and the second component is avoided or reduced due to the one or more magnetic forces.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings, like parts are labeled with like reference numbers. In the drawings.

DETAILED DESCRIPTION

The present disclosure relates to mechanical gear assemblies, gear systems, other types of power transmission assemblies and systems, and methods in which interfacing gears or other corresponding interfacing structures are not only configured to engage one another physically in at least some operational circumstances, but also configured to engage one another magnetically in at least some operational circumstances. Further, in at least some embodiments encompassed herein, the present disclosure relates to a magnetically-assisted mechanical gear mesh or gear assembly, which includes a plurality of ferromagnetic gears arranged with a magnetomotive force (MMF) source to form a magnetic circuit. The magnetic circuit serves to impose attractive force(s) between the interfacing gears, so as to bias the gears such that contact between the gears occurs along particular sides of the gear teeth of the gears (rather than along the opposite sides of the gear teeth), which in turn can reduce backlash between the interfacing gears, or even eliminate backlash between the interfacing gears and thereby achieve zero backlash operation. Also, in at least some other embodiments encompassed herein, the present disclosure relates to a magnetically-assisted mechanical gear mesh or gear assembly that employs permanent magnet gears to achieve magnetic forces between the interfacing gears. Further, in at least some additional embodiments encompassed herein, the present disclosure relates to other types of magnetically-assisted mechanical power transmission systems that employ electromagnets and/or permanent magnets to achieve power transmission between interfacing gears, screws, nuts, racks, pinions, and other types of interfacing structures.

Figure 1:
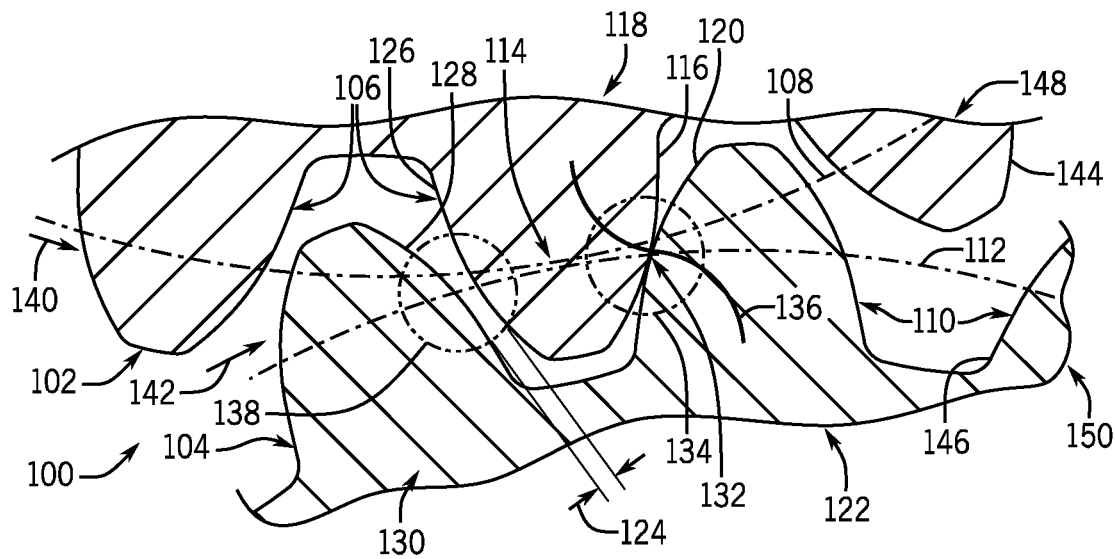
FIG. 1 is a cutaway view of a gear assembly including a driving gear and a driven gear, in which the gear assembly is operated as part of a magnetically-assisted mechanical gear system, in accordance with a first example embodiment encompassed herein.
Figure 2:
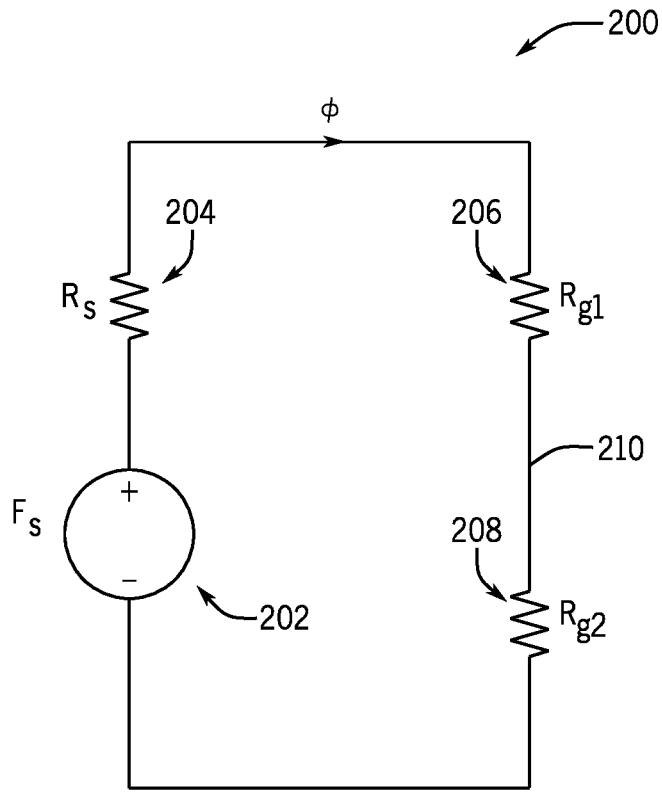
FIG. 2 is a schematic diagram illustrating an example magnetic circuit that is representative of the magnetic components and operation of at least some magnetically-assisted mechanical gear systems and/or other power transmission systems encompassed herein, such as (but not limited to) the magnetically-assisted mechanical gear system of which the gear assembly of FIG. 1 forms a part.

Referring to FIG. 1, a cutaway view is provided of a gear assembly 100 having two interfacing gears, including a first gear that is a driving gear 102 and a second gear that is a driven gear 104. In the present example, each of the driving gear 102 and driven gear 104 is a respective spur gear. Nevertheless, the present disclosure is intended to encompass any of a variety of embodiments that employ any of a variety of different types of gears and gear assemblies, including embodiments that employ, for example, helical gears, bevel gears, worm gears, and planetary gears. Additionally, as will be described further with respect to FIG. 2, the gear assembly 100 can be considered to be part of a magnetically-assisted mechanical gear system in which forces are communicated between the driving gear 102 and the driven gear 104 not only mechanically but also magnetically, and which (from a magnetic standpoint) can be represented as a magnetic circuit 200 as shown in FIG. 2.

More particularly as shown in FIG. 1, the driving gear 102 includes driving gear teeth 106 arranged around the driving gear along a first circular path represented by a first dashed line 108 and extending about a first central axis (not shown) of the driving gear. Also, the driven gear 104 includes driven gear teeth 110 arranged along a second circular path represented by a second dashed line 112 and extending about a second central axis (not shown) of the driven gear. In this illustration, the first and second dashed lines 108 and 112 respectively extend substantially through respective midregions of the driving gear teeth 106 and driven gear teeth 110, respectively, such that, when the driving gear 102 is interfacing the driven gear 104, the first and second dashed lines 108 and 112 are tangent with one another at a location 114 at which the driving gear teeth 106 and driven gear teeth 110 are most closely intermeshed.

Further as shown in FIG. 1, the driving gear 102 particularly is rotated relative to the driven gear 104 so that a counter-clockwise-facing side 116 of a first one 118 of the driving gear teeth 106 is physically in contact with a counter-clockwise-facing side 120 of a first one 122 of the driven gear teeth 110. Consequently, a gap 124 exists between a clockwise-facing side 126 of the first one 118 of the driving gear teeth 106 and a clockwise-facing side 128 of a successive (second) one 130 of the driven gear teeth 110 that is located counter-clockwise of the first one 122 of the driven gear teeth 110.

Additionally, in the present embodiment, a magnetic field is applied in relation to the interfacing driving and driven gears 102 and 104 that creates an attractive magnetic force between the gears. The strongest attractive magnetic force between the driving and driven gears 102 and 104 occurs between the counter-clockwise-facing sides 116 and 120 of the first ones 118 and 122 of the driving and driven gears, respectively. In particular, the attractive magnetic force is strongest at a location 132 at which the counter-clockwise-facing side 116 of the first one 118 of the driving gear teeth 106 is in contact with the counter-clockwise-facing side 120 of the first one 122 of the driven gear teeth 110, within a region 134, due to magnetic flux flowing through that location 132 as indicated by a primary magnetic flux path 136 shown in FIG. 1. By comparison, even though there is an attractive magnetic force also between the clockwise-facing side 126 of the first one 118 of the driving gear teeth 106 and the clockwise-facing side 128 of the successive one 130 of the driven gear teeth 110, such as within a region 138, that attractive magnetic force is substantially weaker than the attractive magnetic force within the region 134 at the location 132 due to the gap 124.

In the present illustration of FIG. 1, it can be assumed that the driving gear 102 is rotating in a counter-clockwise direction indicated by a first arrow 140, and thereby causing the driven gear 104 to rotate in a clockwise direction indicated by a second arrow 142, due to contact between respective contacting pairs of the driving gear teeth 106 and driven gear teeth 110. The driven gear teeth 110 respectively are pushed by the driving gear teeth 106 as the respective counter-clockwise-facing sides of the respective driving gear teeth come in to physical contact with the respective counter-clockwise-facing sides of the respective driven gear teeth. As an example, as shown in FIG. 1, the first one 118 of the driving gear teeth 106 can be understood to be physically pushing against the first one 122 of the driven gear teeth 110 when the driving gear 102 is rotating in the counter-clockwise direction consistent with the first arrow 140.

In a conventional arrangement, the existence of the gap 124 would be a source of backlash movement during operation if the driving gear 102 switched from being rotated in the counter-clockwise direction to being rotated in a clockwise direction, opposite the direction indicated by the first arrow 140 (that is, the driving gear 102 would start to move in the clockwise direction and not initially cause incremental movement of the driven gear 104). However, this is not the case in the present embodiment. Rather, due to the application of the magnetic field, the respective counter-clockwise-facing sides of the respective driving gear teeth 106 continue to be in contact with the respective counter-clockwise-facing sides of the respective driven gear teeth 110 even if the direction of rotation of the driving gear 102 is switched from counter-clockwise rotation to clockwise rotation. In such an operational circumstance, the driven gear teeth 110 respectively are pulled by the driving gear teeth 106.

As an example with reference to FIG. 1, if the driving gear 102 and driven gear 104 have the positions as illustrated and the driving gear 102 is switched to rotate in the clockwise direction, contrary to the direction indicated by the first arrow 140, then the first one 118 of the driving gear teeth 106 will physically pull the first one 122 of the driven gear teeth 110 due to the attractive magnetic force occurring between those teeth along the primary magnetic flux path 136 (as possibly supplemented by some other attractive magnetic forces also pulling in that same direction). This pulling action particularly will tend to rotate the driven gear 104 in the counter-clockwise direction, opposite the direction indicated by the second arrow 142, provided that countervailing forces are not excessive (as discussed further below). As this pulling action begins, the counter-clockwise-facing side 116 of the first one 118 of the driving gear teeth 106 will remain in contact with the counter-clockwise-facing side 120 of the first one 122 of the driven gear teeth 110. In contrast, the gap 124 between the clockwise-facing side 126 of the first one 118 of the driving gear teeth 106 and the clockwise-facing side 128 of the successive one 130 of the driven gear teeth 110 will generally remain present (albeit the gap can vary in extent somewhat as the gears rotate).

Generally speaking, after such pulling action has begun and the driving gear 102 continues to rotate in the clockwise direction opposite that indicated by the first arrow 140, the driving gear 102 will continue to pull the driven gear 104 in the counter-clockwise direction opposite that indicated by the second arrow 142. It will be appreciated that, as such rotation of the driving gear 102 and the driven gear 104 occurs, eventually sufficient rotation will occur that the first ones 118 and 122 of the driving gear teeth 106 and driven gear teeth 110 will rotate apart from one another. As this occurs, respective counter-clockwise-facing sides 144 and 146 of respective next ones 148 and 150 of the driving gear teeth 106 and driven gear teeth 110, respectively, will come into contact with and be attracted to one another by an attractive magnetic force between those teeth, such that the pulling of the driven gear 104 by the driving gear 102 will continue to occur. This manner of operation will occur, with respect to successive pairs of the driving gear teeth 106 and driven gear teeth 110, until the direction of rotation of the driving gear 102 again is reversed, again provided that countervailing forces are not excessive (as discussed further below).

Referring additionally to FIG. 2, as already mentioned above, the gear assembly 100 of FIG. 1 should be understood to form part of a magnetically-assisted mechanical gear system that can be represented by the magnetic circuit (or magnetic circuit diagram) 200 as shown in FIG. 2. As illustrated, the magnetic circuit 200 is a closed magnetic circuit that includes, arranged in series, a magnetomotive force (MMF) source 202, a lumped source reluctance ($R_s$) 204, a first gear reluctance ($R_{g1}$) 206, and a second gear reluctance ($R_{g2}$) 208. In the present embodiment, it is envisioned that the MMF source 202 will be a permanent magnet, although in other embodiments the MMF source can be an electromagnet or a combination of two or more magnets of the same or different types.

Given this arrangement, as illustrated in FIG. 2, a magnetic flux (phi, $\Phi$) generated by the MMF source 202 circulates in the magnetic circuit 200, by passing from the MMF source to and through the lumped source reluctance 204, then through the first gear reluctance 206, next through the second gear reluctance 208, and then back to the MMF source. With reference to the example of FIG. 1, the first gear reluctance 206 can be considered to be the reluctance of the driving gear 102 and the second gear reluctance 208 can be considered to be the reluctance of the driven gear 104 that interfaces/mates/meshes to the driving gear. Also, the lumped source reluctance 204 can be considered to represent the sum of the reluctances of all other structures, and/or gaps, other than the driving gear 102 and driven gear 104, through which magnetic flux flows as it proceeds from and back to the MMF source 202. Figuratively, a link 210 shown in FIG. 2 connecting the first gear reluctance 206 and the second gear reluctance 208 can be considered to represent the magnetic flux communicated between the driving gear 102 (and particularly the driving gear teeth 106 thereof) and the driven gear 104 (and particularly the driven gear teeth 110 thereof).

The magnetic flux communicated between the driving gear 102 and the driven gear 104 can take multiple paths, and these paths can vary during rotation of those gears. For example, in the operational circumstance illustrated by FIG. 1, some of the magnetic flux between the driving gear 102 and the driven gear 104 can follow the primary magnetic flux path 136 (e.g., through the location 132 within the region 134) and also some of that magnetic flux can follow an alternate magnetic flux path across the gap 124 (e.g., within the region 138). Nevertheless, although multiple flux paths (and associated flux lines) exist, the majority of the magnetic flux, and associated attractive magnetic force between the driving gear 102 and the driven gear 104, will be concentrated along the path of least reluctance. In FIG. 1, this path of least reluctance occurs within the region 134 and particularly at or near the location 132 at which the respective first ones 118 and 122 of the driving and driven gear teeth 106 and 110 are touching, along the primary magnetic flux path 136.

Because the magnetic flux between the driving gear 102 and the driven gear 104 is concentrated along the primary magnetic flux path 136, the attractive magnetic force associated with that primary magnetic flux path occurring between the counter-clockwise-facing sides 116 and 120 of the first ones 118 and 122 of the driving gear teeth 106 and driven gear teeth 110 constitutes the dominant attractive magnetic force between the driving gear 102 and the driven gear 104. Because of the dominance of this particular attractive magnetic force when the driving gear 102 and driven gear 104 are positioned as shown in FIG. 1, all of the attractive magnetic forces existing between the driving gear 102 and driven gear 104 overall tend to maintain the counter-clockwise-facing sides 116 and 120 of the first ones 118 and 122 of the driving gear teeth 106 and driven gear teeth 110 in contact with one another. Consequently, when the driving gear 102 and driven gear 104 are positioned particularly as shown in FIG. 1, the gears are in an equilibrium state, magnetically-speaking.

More generally, when a magnetic flux is caused to flow through the driving gear 102 and driven gear 104 in accordance with the magnetic circuit 200, there will be a greater flux density at the location (or region) of contact of the touching sides of a given pair of the driving gear teeth 106 and driven gear teeth 110 (such as at the location 132), than across a gap (such as the gap 124) between non-touching sides of any pair of the driving gear teeth and driven gear teeth. Further, because magnetic force is proportional to flux density squared, the attractive magnetic force between the touching sides of such a given pair of the driving gear teeth 106 and driven gear teeth 110 will be much greater than the attractive magnetic force between non-touching sides of any pair of the driving gear teeth and driven gear teeth that are separated by a gap such as the gap 124. Thus, even though multiple magnetic flux paths and associated attractive magnetic forces can exist between different pairs of the driving gear teeth 106 and driven gear teeth 110 at any given time, the attractive magnetic force between the touching sides of any given pair of the driving gear teeth 106 and driven gear teeth 110 that are in contact at that given time will constitute the dominant attractive magnetic force between the driving gear 102 and driven gear 104. Because of the dominance of this attractive magnetic force, an equilibrium state will exist when such a given pair of the driving gear teeth 106 and driven gear teeth 110 are in contact with one another.

The gear assembly 100, when operating as a magnetically-assisted mechanical gear system in accordance with the magnetic circuit 200, will tend to avoid backlash movement in the operational circumstance illustrated by FIG. 1. That is, backlash movement will be avoided when the direction of rotation of the driving gear 102 switches from being in the direction of the first arrow 140 to the opposite direction, so long as the attractive magnetic force experienced between the counter-clockwise-facing sides 116 and 120 of the first ones 118 and 122 of the driving gear teeth 106 and driven gear teeth 110 (and any other attractive magnetic forces tending to cause those surfaces to remain in contact) is not exceeded by other countervailing forces. Such countervailing forces can include the mechanical driving force (or torque) applied to the driving gear 102 causing that driving gear to rotate in the direction opposite that of the first arrow 140, as well as any mechanical force applied to the driven gear 104 by any load that is directly or indirectly borne by the driven gear tending to prevent rotation in the direction opposite that of the second arrow 142. Also, such countervailing forces can include other magnetic forces that tend to pull the counter-clockwise-facing sides 116 and 120 apart from one another, such as any attractive magnetic force existing between the clockwise-facing sides 126 and 128 of the first one 118 of the driving gear teeth 106 and the successive one 130 of the driven gear teeth 110 across the gap 124.

However, it should be recognized that, additionally with respect to the operational circumstance illustrated by FIG. 1, backlash movement can occur if the countervailing forces exceed the attractive magnetic force experienced between the counter-clockwise-facing sides 116 and 120 of the first ones 118 and 122 of the driving gear teeth 106 and driven gear teeth 110 (as supplemented by any other attractive magnetic forces tending to cause those surfaces to remain in contact). In such case, the first one 118 of the driving gear teeth 106 (of the interfacing gear mesh) will transiently travel through the gap (or backlash region) 124 until the clockwise-facing side 126 of the first one 118 of the driving gear teeth 106 contacts the clockwise-facing side 128 of the successive one 130 of the driven gear teeth 110.

When the clockwise-facing sides 126 and 128 are in contact, such that the contact and non-contact sides of the gear teeth are swapped between the counter-clockwise-facing sides 116 and 120 and the clockwise-facing sides 126 and 128, a new equilibrium situation or state will have been reached. In this equilibrium state, the strongest attractive magnetic force will be occurring between the clockwise-facing sides 126 and 128, due to a new primary magnetic flux path extending from the first one 118 of the driving gear teeth 106 to the successive one 130 of the driven gear teeth 110. After this new equilibrium state arises, to the extent that the driving gear 102 continues to rotate in the clockwise direction opposite the direction indicated by the first arrow 140, successive ones of the driving gear teeth 106 (beginning with the first one 118) will mechanically push successive ones of the driven gear teeth 110 (beginning with the successive one 130) so that the driven gear 104 is driven to rotate in the counter-clockwise direction opposite the direction indicated by the second arrow 142.

Notwithstanding the above description regarding how backlash can occur, the present disclosure is intended to encompass embodiments and implementations that are configured, designed, and/or operated to reduce, minimize, or eliminate such backlash movement from occurring. In particular, in accordance with at least some embodiments encompassed herein, backlash movement can be avoided by sizing or configuring the magnetic circuit 200 so that the amplitude (or magnitude) of the attractive magnetic force occurring along the primary magnetic flux path (e.g., along the primary magnetic flux path 136) between any given pair of contacting teeth of the driving gear and driven gear is greater than the maximum mechanical force the gear mesh will realize in operation. This can be achieved, for example, by appropriately sizing the MMF source 202 of the magnetic circuit 200, so that a sufficiently large magnetic field and associated magnetic flux is communicated along the link 210, between the driving gear 102 and the driven gear 104. Also or additionally this can be achieved by appropriately configuring the shapes of the driving gear teeth 106 and/or the driven gear teeth 110 so that the proportion of magnetic flux that is communicated between a given contacting pair of teeth is much greater than the proportion of magnetic flux that is communicated between non-contacting pairs of teeth (e.g., by way of air gaps, etc.).

Although at least some embodiments encompassed herein are intended to entirely or substantially eliminate the occurrence of backlash movement, at least some other (or alternate) embodiments encompassed herein can be configured to allow backlash movement to occur under certain operational circumstances but to prevent, reduce, or minimize the occurrence of backlash movement under other operational circumstances. For example, in some such embodiments, the magnetic circuit (e.g., corresponding to the magnetic circuit 200) can be sized so that the magnetically-assisted mechanical gear system is suited for backlash-free operation in relation to a lower volume and mass (e.g., in terms of the load borne by the driven gear) than that required for the maximum operating force/torque to be delivered to the driven gear. If sized in this manner, the magnetically-assisted mechanical gear system will still eliminate backlash movement under part-load conditions but allow backlash movement if the load borne by the driven gear increases above a reversing backlash force threshold. This sizing method can be desirable for systems that must apply large forces (torques) to quickly settle in on a position and then apply lower forces in alternating directions to move in small increments to reject disturbances and provide precise positioning in a localized region where the holding torque is smaller than the maximum torque.

It should be appreciated that the present disclosure encompasses numerous variations of magnetically-assisted mechanical gear systems that can operate in accordance with, or substantially or largely in accordance with, the description provided above regarding the gear assembly 100 of FIG. 1 and the magnetic circuit 200 of FIG. 2. For example, referring to FIG. 3, a top perspective view is provided of a first additional example embodiment of a magnetically-assisted mechanical gear system 300 that, as described in further detail, includes two (rather than merely one) MMF sources. As shown, the gear system 300 includes an input shaft 302 that extends along an input axis 304 from an input terminal 306, through a first input shaft bearing 308 and to a second input shaft bearing 310. Additionally, the gear system 300 includes an output shaft 312 that extends along an output axis 314 from an output terminal 316, through a first output shaft bearing 318 and to a second output shaft bearing 320. The input axis 304 extends parallel to the output axis 314.

Also, the first input shaft bearing 308 and second output shaft bearing 320 are positioned along a first end 322 of a support structure 324, and the second input shaft bearing 310 and first output shaft bearing 318 are positioned along a second end 326 of the support structure 324, such that the input terminal 306 and output terminal 316 are respectively located at (adjacent to) the first end 322 and the second end 326 of the support structure, respectively, opposite one another. Although the input terminal 306 and output terminal 316 are respectively located at (adjacent to) the first end 322 and the second end 326 of the support structure in the embodiment of FIG. 3, in alternate embodiments the input terminal and output terminal both can be located at the same end of the support structure.

Further as shown, the input shaft 302 supports thereon, as one proceeds from the first input shaft bearing 308 toward second input shaft bearing 310, a driving (input) gear 330, a first MMF source 332, and a first hollow cylinder 334, all of which are coaxial about the input axis 304. Also, the output shaft 312 supports thereon, as one proceeds from the second output shaft bearing 320 toward first output shaft bearing 318, a driven (output) gear 340, a second MMF source 336, and a second hollow cylinder 338, all of which are coaxial about the output axis 314. Further, the driving gear 330 is aligned with the driven gear 340, so that driving gear teeth 328 of the driving gear 330 intermesh with, and can impart mechanical force/torque to, driven gear teeth 342 of the driven gear 340. Also, the first hollow cylinder 334 is aligned with the second hollow cylinder 338, and the two hollow cylinders respectively have diameters such that the two hollow cylinders are not in contact with one another but rather are separated from one another by an air gap 344. Although each of the driving gear 330, first hollow cylinder 334, driven gear 340, and second hollow cylinder 338 is a ferromagnetic structure that can conduct magnetic flux and experience magnetic attractive (or repulsive) forces, the input shaft 302 and output shaft 312 are non-magnetic structures.

Figure 3:
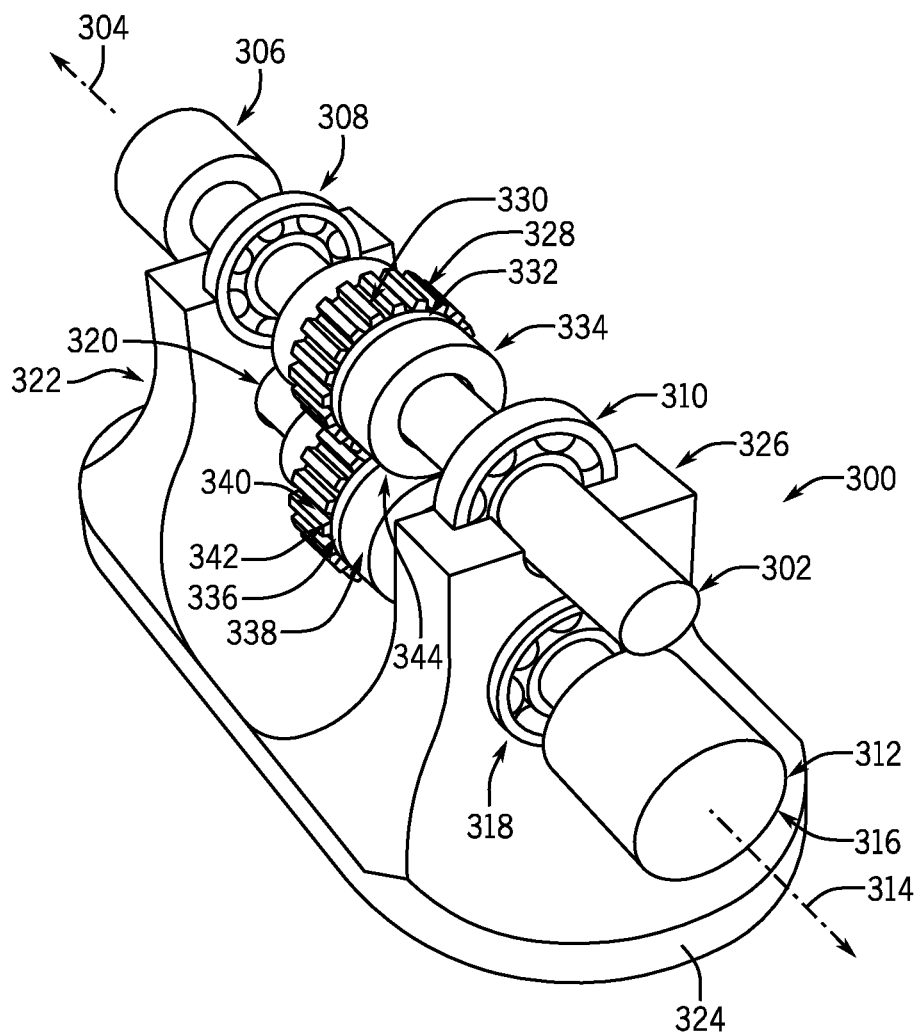
FIG. 3 is a top perspective view of a magnetically-assisted mechanical gear system that includes two (rather than merely one) MMF sources, in accordance with an additional example embodiment encompassed herein.

Further with respect to FIG. 3, each of the first MMF source 332 and the second MMF source 336 is a respective ring magnet (or annular magnet), with the first MMF source 332 being positioned immediately between (and adjacent to each of) the driving gear 330 and the first hollow cylinder 334 and the second MMF source 336 being positioned immediately between the driven gear 340 and the second hollow cylinder 338. In the present embodiment, the first MMF source 332 has a diameter that is equal or substantially equal to that of the first hollow cylinder 334 (but less than the outer diameter of the driving gear 330 determined by the driving gear teeth 328. Also, the second MMF source 336 has a diameter that is equal or substantially equal to that of the second hollow cylinder 338 but less than the outer diameter of the driven gear 340 determined by the driven gear teeth 342. Consequently, in the present embodiment, the air gap 344 is also present between the first and second MMF sources 332 and 336.

Further, so as to generate a magnetic circuit, the first MMF source 332 can be understood to have north and south poles respectively at first and second axial ends of the first MMF source 332 that are respectively adjacent to the driving gear 330 and the first hollow cylinder 334, and the second MMF source 336 can be understood to have south and north poles respectively at first and second axial ends of the second MMF source 336 that are respectively adjacent to the driven gear 340 and the second hollow cylinder 338 (or vice-versa, with respect to both of the MMF sources 332 and 336). In this regard, the magnetic circuit 200 of FIG. 2 can be considered to be representative of the magnetically-assisted mechanical gear system 300 if one not only considers the first and second gear reluctances 206 and 208 to correspond to the reluctances of the driving gear 330 and driven gear 340 respectively, but also considers the MMF source 202 to be have two parts that respectively correspond to the first and second MMF sources 332 and 336 and the lumped source reluctance 204 to be representative of the sum total of the reluctances associated with each of the first and second hollow cylinders 334 and 338 and the air gap 344 (among other things).

Given this arrangement, magnetic flux flows through and from the first MMF source 332 to the first hollow cylinder 334, across the air gap 344 to the second hollow cylinder 338, through the second MMF source 336, through the driven gear 340, through the driving gear 330, and back to the first MMF source. As described in regard to FIG. 1, the magnetic flux that flows through the gear mesh creates an attractive force at interfacing ones of the driving gear teeth 328 and driven gear teeth 342 that are interfacing at the gear mesh, so as to maintain contact between those teeth notwithstanding switching of the rotational direction of the driving gear 330, and thus serves to eliminate (or reduce) backlash movement. The first and second hollow cylinders 334 and 338 (which are ferromagnetic hollow cylinders) are used to complete the magnetic circuit flux path between the two axes of motion (associated with the input shaft 302 and output shaft 312) without being in contact with one another.

In the present example embodiment of FIG. 3, it is assumed that each of the first and second MMF sources 332 and 336 is a respective axially magnetized permanent magnet (or each includes one or more respective axially magnetized permanent magnets). Nevertheless, in alternate embodiments, one or both of the MMF sources 332 and 336 can respectively be a respective electromagnet. In such an embodiment, any such electromagnet can be formed by way of an electrical coil (e.g., wire loops) surrounding a ferromagnetic core. The electrical coil can include leads that are coupled to an electric power source, and be operated to carry (conduct through the coil) electric current provided by the electric power source. Also, in at least some alternate embodiments, only one of the first MMF source 332 and second MMF source 336 is present or serves to generate magnetic flux (e.g., one of the MMF sources can be omitted and ferromagnetic material used in its place) to complete the magnetic circuit.

To the extent that one or both of the first and second MMF sources 332 and 336 is an electromagnet, this can introduce controllability to the magnetically-assisted mechanical gear system 300 (and the magnetic circuit 200), and/or can allow the system to be operated at temperatures beyond those which are attainable if only permanent magnets are utilized as the first and second MMF sources 332 and 336. More particularly, it should be appreciated that, if one or both of the MMF sources 332 and 336 is an electromagnet, the magnetically-assisted mechanical gear system 300 not only can be operated in a manner that eliminates (or reduces) backlash movement if the electromagnet is energized (results in zero backlash), but also can be operated in a manner that does not eliminate (or reduce) backlash movement if the electromagnet is de-energized. In such an embodiment, the gear system 300 in some operational circumstances can be operated so that a constant level of current is directed to flow through the electromagnet, so that the electromagnet provides a constant MMF amplitude and delivers a constant or substantially constant level of magnetic flux. Also, in at least some other operational circumstances, the electromagnet is de-energized (such that current does not flow through the coil, and the coil is switched off), in which case the gear system 300 can behave as though it is a conventional gear mesh and experience backlash movement.

In additional embodiments in which one or both of the first and second MMF sources 332 and 336 are electromagnets, the MMF source(s) are not limited to being fully-switched-on and fully-switched-off, but rather can be energized to varying degrees. In some such embodiments, a controller (not shown) is provided that governs the current (or currents) flowing through one or both of the first and second MMF sources 332 and 336. Such a controller can for example be a microprocessor-based controller. Based upon the level of the current(s) flowing through the first and second MMF sources 332 and 336, the magnetic flux generated by those MMF sources and passing through the gear system can be varied to suit different operational circumstances or conditions. For example, in some cases, by causing the current(s) flowing through the MMF sources 332 and 336 to be non-zero but less than a maximum amount, backlash movement is allowed to occur to some extent but not as frequently as it would occur if no magnetic flux was present in the gear system. That is, the current(s) are controllable in order to adjust the maximum anti-backlash torque level. Also, in at least some embodiments, the excitation current is controlled to set a desired backlash reverse driving torque threshold. Current can be lowered to reduce the torque threshold, which improves efficiency, and current can be increased to increase the torque threshold, which reduces efficiency. Additionally in at least some embodiments, the coil can be energized transiently prior to reversing the direction of angular velocity and de-energized after the reversing transition is complete. This approach allows for higher efficiency operation (more backlash) during continuous forward/reverse rotation, and yet also retains zero (or reduced) backlash operation upon direction reversal.

Further with reference to the gear system 300 of FIG. 3, it should also be appreciated that, depending upon the embodiment, the air gap 344 can be adjustable during the manufacturing or assembly of the gear system 300. More particularly, the air gap 344 can be adjusted based upon the selection and/or implementation of the first hollow cylinder 334 and/or the second hollow cylinder 338, for example, by changing the diameter(s) of one or both of those cylinders or the axial location(s) of one or both of those cylinders. By adjusting the air gap 344 in any of these manner, this can result in adjustments to the maximum torque achievable before backlash movement occurs. That is, such adjustments allow for the maximum anti-backlash torque level to be set during assembly.

Figure 4:
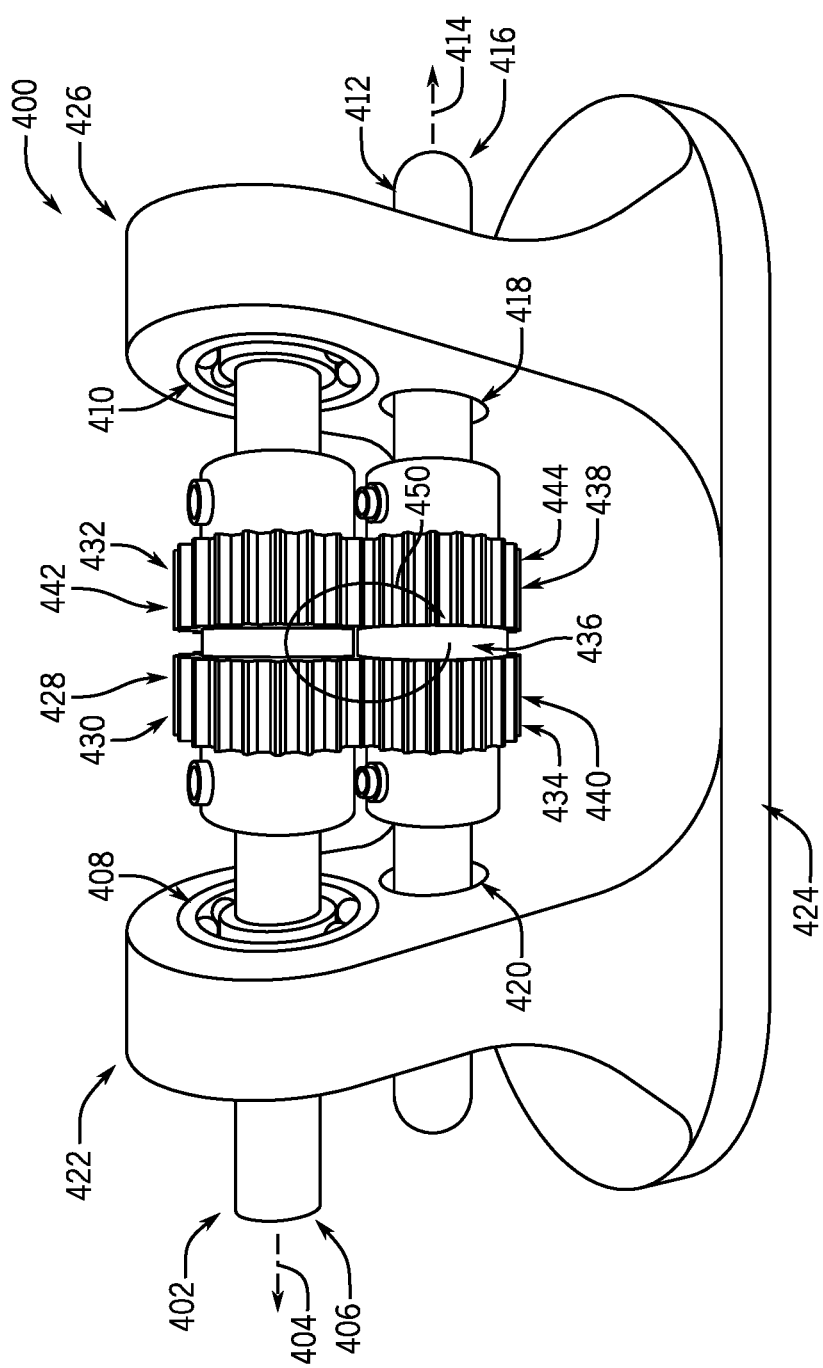
FIG. 4 is a side perspective view of a magnetically-assisted mechanical gear system that includes two pairs of driving and driven gears (rather than merely a single driving gear and a single driven gear), in accordance with an additional example embodiment encompassed herein.

Referring now to FIG. 4, a side perspective view is provided of a second additional example embodiment of a magnetically-assisted mechanical gear system 400 that, as described in further detail, includes two pairs of driving and driven gears (rather than merely a single driving gear and a single driven gear). As shown, the gear system 400 includes an input shaft 402 that extends along an input axis 404 from an input terminal 406, through a first input shaft bearing 408 and to a second input shaft bearing 410. Additionally, the gear system 400 includes an output shaft 412 that extends along an output axis 414 from an output terminal 416, through a first output shaft bearing 418 and to a second output shaft bearing 420. The input axis 404 extends parallel to the output axis 414.

Also, the first input shaft bearing 408 and second output shaft bearing 420 are positioned along a first end 422 of a support structure 424, and the second input shaft bearing 410 and first output shaft bearing 418 are positioned along a second end 426 of the support structure 424, such that the input terminal 406 and output terminal 416 are respectively located at (adjacent to) the first end 422 and the second end 426 of the support structure, respectively, opposite one another. Although the input terminal 406 and output terminal 416 are respectively located at (adjacent to) the first end 422 and the second end 426 of the support structure in the embodiment of FIG. 4, in alternate embodiments the input terminal and output terminal both can be located at the same end of the support structure.

Further as shown, the input shaft 402 supports thereon, as one proceeds from the first input shaft bearing 408 toward second input shaft bearing 410, a first driving (input) gear 430 and a second driving (input) gear 432, all of which are coaxial about the input shaft 402. Also, the output shaft 412 supports thereon, as one proceeds from the second output shaft bearing 420 toward first output shaft bearing 418, a first driven (output) gear 434, a MMF source 436, and a second driven (output) gear 438, all of which are coaxial about the output shaft 412. Further, the first driving gear 430 is aligned with the first driven gear 434, so that first driving gear teeth 428 of the first driving gear 430 intermesh with, and can impart mechanical force/torque to, first driven gear teeth 440 of the first driven gear 434. Additionally, the second driving gear 432 is aligned with the second driven gear 438, so that second driving gear teeth 442 of the second driving gear 432 intermesh with, and can impart mechanical force/torque to, second driven gear teeth 444 of the second driven gear 438. Although each of the first and second driving gears 430 and 432 and the first and second driven gears 434 and 438 is a ferromagnetic structure that can conduct magnetic flux and experience magnetic attractive (or repulsive) forces, the input shaft 402 and output shaft 412 are non-magnetic structures.

Further with respect to FIG. 4, the MMF source 436 is a respective ring magnet (or annular magnet), and is positioned immediately between (and adjacent to each of) the first driven gear 434 and the second driven gear 438. So as to generate a magnetic circuit, the MMF source 436 can be understood to have north and south poles respectively at first and second axial ends of the MMF source 436 that are respectively adjacent to the first driven gear 434 and the second driven gear 438, respectively. In the present embodiment, the MMF source 436 has a diameter that is less than the outer diameter of the first and second driven gears 434 and 438. Although the MMF source 436 is positioned between the first and second driven gears 434 and 438, no corresponding MMF source or other structure is positioned between the first and second driving gears 430 and 432. Rather, in the present embodiment the first and second driving gears 430 and 432 are positioned immediately adjacent one another along the input shaft 402. Although the first and second driving gears 430 and 432 are considered distinct gears in the present embodiment, in an alternate embodiment the first and second driving gears can be integrally formed with one another as a single gear that interfaces both of the first and second driven gears 434 and 438.

It should be recognized that the gear system 400 of FIG. 4 differs from the gear system 300 of FIG. 3 in that (among other things) the gear system 400 includes not just one but rather two distinct gears along each of the input shaft 402 and the output shaft 412 (that is, a second gear is added within each axis of motion) to complete the magnetic circuit flux path. Thus, as illustrated by a looping arrow 450 in FIG. 4, in the gear system 400, magnetic flux flows through and from the MMF source 436 through the first driven gear 434, then through the first driving gear 430, then through the second driving gear 432, then through the second driven gear 438, and finally back to the MMF source 436 to complete the magnetic circuit. Further, as described in regard to FIG. 1, the magnetic flux that flows through the gear mesh between the first driven and driving gears 434 and 430 creates an attractive force at interfacing ones of the first driving gear and driven gear teeth 428 and 440. Likewise, the magnetic flux that flows through the gear mesh between the second driving and driven gears 432 and 438 creates an attractive force at interfacing ones of the second driving gear and driven gear teeth 442 and 444. These attractive magnetic forces between the first driving and driven gears 430 and 434 and between the second driving and driven gears 432 and 438 serve to cause contact between the interfacing teeth of those pairs of gears to maintain contact notwithstanding switching of the rotational direction of the driving gears 430 and 432, and thus serves to eliminate (or reduce) backlash movement.

Because the gear system 400 of FIG. 4 includes not one but two pairs of interfacing gears, it will be appreciated that a modified version of the magnetic circuit 200 of FIG. is applicable as a representation of the gear system 400. In particular, although the MMF source 436 can be considered to correspond to the MMF source 202, the modified version of the magnetic circuit will include not only the first and second gear reluctances 206 and 208, which can correspond to the first driven gear 434 and first driving gear 430, but also third and fourth gear reluctances, which can correspond to the second driving gear 432 and the second driven gear 438, where all four of the gear reluctances can be coupled in series with the MMF source. The lumped source reluctance 204 need not be present or, alternatively, can be considered to be representative of (among other things) the reluctance associated with any discontinuity between the first and second driving gears 430 and 432. Although the gear system 400 of FIG. 4 does not include an air gap directly corresponding to the air gap 344 of the gear system 300 of FIG. 3, in alternate embodiments one or more air gaps can also be provided in regard to the gear system 400 (e.g., by creating spaces between the MMF source 436 and the adjacent ones of the gears 434 and 438 or between the first and second driving gears 430 and 432).

In the present embodiment of FIG. 4, the MMF source 436 includes an axially magnetized permanent magnet (or one or more axially magnetized permanent magnets). Nevertheless, in alternate embodiments, the MMF source 436 can be an electromagnet (or one or more electromagnets). In such an embodiment, the electromagnet can be formed by way of an electrical coil (e.g., wire loops) surrounding a ferromagnetic core. The electrical coil can include leads that are coupled to an electric power source, and be operated to carry (conduct through the coil) electric current provided by the electric power source. Use of an electromagnet as the MMF source 436 can introduce controllability to the magnetically-assisted mechanical gear system 400, and/or can allow the system to be operated at temperatures beyond those which are attainable if only permanent magnet(s) is or are utilized as the MMF source 436. More particularly, it should be appreciated that, if the MMF source 436 is an electromagnet, the magnetically-assisted mechanical gear system 400 not only can be operated in manner that eliminates (or reduces) backlash movement if the electromagnet is energized (results in zero backlash), but also can be operated in a manner that does not eliminate (or reduce) backlash movement if the electromagnet is de-energized. In such an embodiment, the gear system 400 in some operational circumstances can be operated so that a constant level of current is directed to flow through the electromagnet, so that the electromagnet provides a constant MMF amplitude and delivers a constant or substantially constant level of magnetic flux. Also, in at least some other operational circumstances, the electromagnet is de-energized (such that current does not flow through the coil, and the coil is switched off), in which case the gear system 400 can behave as though it is a conventional gear mesh and experience backlash movement.

In additional embodiments in which the MMF source 436 is formed using an electromagnet, the MMF source is not limited to being fully-switched-on and fully-switched-off, but rather can be energized to varying degrees. In some such embodiments, a controller (not shown) is provided that governs the current flowing through the MMF source 436. Based upon the level of the current flowing through the first MMF source 436, the magnetic flux generated by the MMF source and passing through the gear system can be varied to suit different operational circumstances or conditions. For example, in some cases, by causing the current flowing through the MMF source 436 to be non-zero but less than a maximum amount, backlash movement is allowed to occur to some extent but not as frequently as it would occur if no magnetic flux was present in the gear system. That is, the current is controllable in order to adjust the maximum anti-backlash torque level. Also, in at least some embodiments, the excitation current is controlled to set a desired backlash reverse driving torque threshold. Current can be lowered to reduce the torque threshold, which improves efficiency, and current can be increased to increase the torque threshold, which reduces efficiency. Additionally in at least some embodiments, the coil can be energized transiently prior to reversing the direction of angular velocity and de-energized after the reversing transition is complete. This approach allows for higher efficiency operation (more backlash) during continuous forward/reverse rotation, and yet also retains zero (or reduced) backlash operation upon direction reversal.

It should be appreciated, with respect to the embodiments of FIG. 1, FIG. 3, and FIG. 4, that in these embodiments the various driving gear teeth and driven gear teeth can each have an involute gear profile in terms of the shape of each respective tooth. Yet the present disclosure also is intended to encompass other embodiments in which one or more of the teeth of one or more of the driving gear(s) and/or driven gear(s) have one or more other shapes. For example, in some alternate embodiments, one or more of the driving gear teeth and/or one or more of the driven gear teeth can have a cycloid profile. Also it should be appreciated that, in some alternate embodiments, the teeth of a driving gear of a pair of interfacing gears can have a different shape than the teeth of a driven gear of that pair of interfacing gears.

Figure 5:
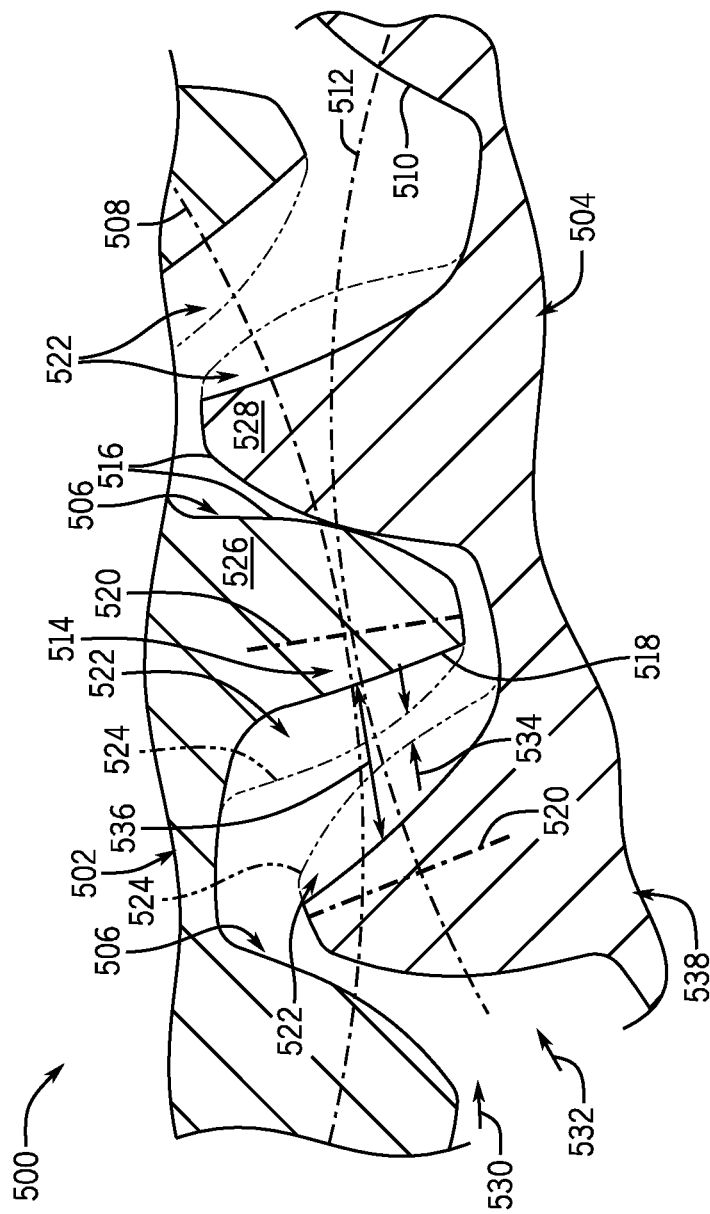
FIG. 5 is a cutaway view of a gear assembly including a driving gear and a driven gear, in which the gear assembly is operated as part of a magnetically-assisted mechanical gear system and in which the gears have gear teeth with a semi-involute gear profile, in accordance with an additional example embodiment encompassed herein.

Further in this regard, FIG. 5 shows a cutaway view of an additional gear assembly 500 having two interfacing gears, including a first gear that is a driving gear 502 and a second gear that is a driven gear 504. In this example of FIG. 5, each of the driving gear 502 and driven gear 504 again is a respective spur gear as shown in FIG. 1, and the additional gear assembly 500 again can be considered to be part of a magnetically-assisted mechanical gear system in which forces are communicated between the driving gear 502 and the driven gear 504 not only mechanically but also magnetically, in accordance with the magnetic circuit 200 of FIG. 2. Additionally as shown, the driving gear 502 includes driving gear teeth 506 arranged around the driving gear along a first circular path represented by a first dashed line 508 and extending about a first central axis (not shown) of the driving gear. Also, the driven gear 504 includes driven gear teeth 510 arranged along a second circular path represented by a second dashed line 512 and extending about a second central axis (not shown) of the driven gear. In this illustration, the first and second dashed lines 508 and 512 respectively extend substantially through respective midregions of the driving gear teeth 506 and driven gear teeth 510, respectively, such that, when the driving gear 502 is interfacing the driven gear 504, the first and second dashed lines 508 and 512 are tangent with one another at a location 514 at which the driving gear teeth 506 and driven gear teeth 510 are most closely intermeshed.

Although the additional gear assembly 500 of FIG. 5 in many respects is the same as the gear assembly 100 of FIG. 1, the two gear assemblies are different from one another in that the driving gear teeth 506 and driven gear teeth 510 of the additional gear assembly 500 have a different shape relative to the driving gear teeth 106 and driven gear teeth 110 of the gear assembly 100. In particular, although each of the driving gear teeth 106 and driven gear teeth 110 of the gear assembly 100 has an involute gear profile, each of the driving gear teeth 506 and driven gear teeth 510 of the additional gear assembly 500 has a semi-involute gear profile. More particularly, each of the driving gear teeth 506 and driven gear teeth 510 has a gear profile in which a respective counter-clockwise-facing side 516 of the respective tooth is consistent in shape with an involute gear profile, but also in which a respective clockwise-facing side 518 of the respective tooth has a contour that follows a respective path that is closer to a respective radially-extending midline 520 of the respective tooth (radially-extending, in terms of extending radially outward from a respective central axis of the respective driving gear or driven gear on which the respective tooth is formed) than would be the case if that respective clockwise-facing side had a shape consistent with an involute gear profile. That is, the respective contour of each respective clockwise-facing side 518 of each respective tooth of the driving gear teeth 506 and driven gear teeth 510 is closer to the respective radially-extending midline 520 of the respective tooth than is the respective contour of the respective counter-clockwise-facing side 516 of the respective tooth.

In this respect, as illustrated in FIG. 5, each of the driving gear teeth 506 and driven gear teeth 510 is missing a respective tooth section 522 that otherwise would have been present if the driving gear teeth and driven gear teeth had the involute gear profile of the driving gear teeth 106 and driven gear teeth 110 of FIG. 1. The respective tooth sections 522 are particularly illustrated in FIG. 5 as extending between the respective clockwise-facing sides 518 of the driving gear teeth 506 and driven gear teeth 510 and respective dashed lines 524 indicative of where the respective clockwise-facing sides of the teeth would be if those respective teeth had the involute gear profile illustrated in FIG. 1. Although not necessarily the case in all embodiments, in the present example embodiment the respective counter-clockwise-facing sides 516 having the involute gear profile can be substantially convex in shape and the respective clockwise-facing sides 518 can be substantially concave in shape. Further, in the illustration provided by FIG. 5, the respective counter-clockwise-facing sides 516 of the respective driving gear teeth 506 and respective driven gear teeth 510 are intended to be the respective contact sides of the respective teeth, and the respective clockwise-facing sides 518 of the respective driving gear teeth and respective driven gear teeth are intended to be the respective non-contact sides of the respective teeth. For example, the respective counter-clockwise-facing side 516 of a first one 526 of the driving gear teeth 506 is shown to be in contact with the respective counter-clockwise-facing side 516 of a first one 528 of the driven gear teeth 510, as can be the case when the driving gear is rotating in a counter-clockwise direction consistent with a first arrow 530 and providing mechanical force/torque causing the driven gear 504 to rotate in a clockwise direction consistent with a second arrow 532.

Given this to be the case, it can be seen that the particular shape of the clockwise-facing sides 518 of the driving gear teeth 506 and driven gear teeth 510 serves to increase the spacing between respective ones of the non-contact sides of neighboring ones of the driving gear teeth 506 and driven gear teeth 510 from what that spacing would otherwise be. For example, with respect to FIG. 5, it can be seen that the respective clockwise-facing side 518 of a successive (second) one 538 of the driven gear teeth 510 that is located counter-clockwise of the first one 528 of the driven gear teeth 510 is positioned (at least by one measure) a first distance 536 from the respective clockwise-facing side 518 of the first one 526 of the driving gear teeth 506. Further, it can also be seen that the first distance 536 is significantly greater than a second distance 534 between the respective dashed lines 524 extending from those respective clockwise-facing sides 518 of the successive one 538 of the driven gear teeth 510 and the first one 528 of the driven gear teeth 510. Thus, in the embodiment and operational circumstance illustrated by FIG. 5, the respective clockwise-facing sides 518 of the successive one 538 of the driven gear teeth 510 and the first one 528 of the driven gear teeth, which are the non-contacting sides of those respective teeth, are farther apart from one another than in the embodiment and operational circumstance illustrated by FIG. 1.

The shape of the driving gear teeth 506 and driven gear teeth 510 can be beneficial to the operation of the additional gear assembly 500 in terms of further eliminating or reducing backlash movement. More particularly, it will be recognized that, because the non-contacting sides of respective ones of the driving gear teeth 506 and driven gear teeth 510 that are in proximity with one another are spaced apart by greater distances than would otherwise be the case (e.g., in the embodiment of FIG. 1), this reduces the attractive magnetic forces between the non-contacting sides of proximate pairs of the driving gear teeth 506 and driven gear teeth 510 of the gear mesh. That is, because of the semi-involute profile of the driving gear teeth 506 and driven gear teeth 510 (and particularly the absence of material eliminated along the non-contact sides of the respective teeth corresponding to the respective tooth sections 522) and consequent increased spacing between interfacing driving and driven gear teeth along the non-contact sides of the teeth, the amplitude of weaker attractive forces referred to in regard to FIG. 1 (e.g., as occurring in the region 138) is further reduced.

With this being the case, if the direction of rotation of the driving gear 502 is reversed from a direction consistent with the first arrow 530 to a direction opposite that indicated by the first arrow, there is less magnetic attraction between the non-contact sides of neighboring teeth that might cause (in combination with any mechanical forces or momentum of the driven gear 504) the magnetic attraction between the contact sides of contacting ones of the teeth to be overcome. More particularly, in the illustration of FIG. 5, there is less likelihood that any magnetic attraction between the clockwise-facing sides 518 of the first one 526 of the driving gear teeth 506 and the successive one 538 of the driven gear teeth 510 would (in combination with any mechanical forces or momentum of the driven gear 504) cause the counterclockwise-facing sides 516 of the first one 526 of the driving gear teeth 506 and first one 528 of the driven gear teeth 510 to be separated. Given this to be the case, the embodiment of the gear assembly 500 with the gear tooth profile shown in FIG. 5 is less likely to experience backlash movement than the gear assembly 100 of FIG. 1.

Figure 6:
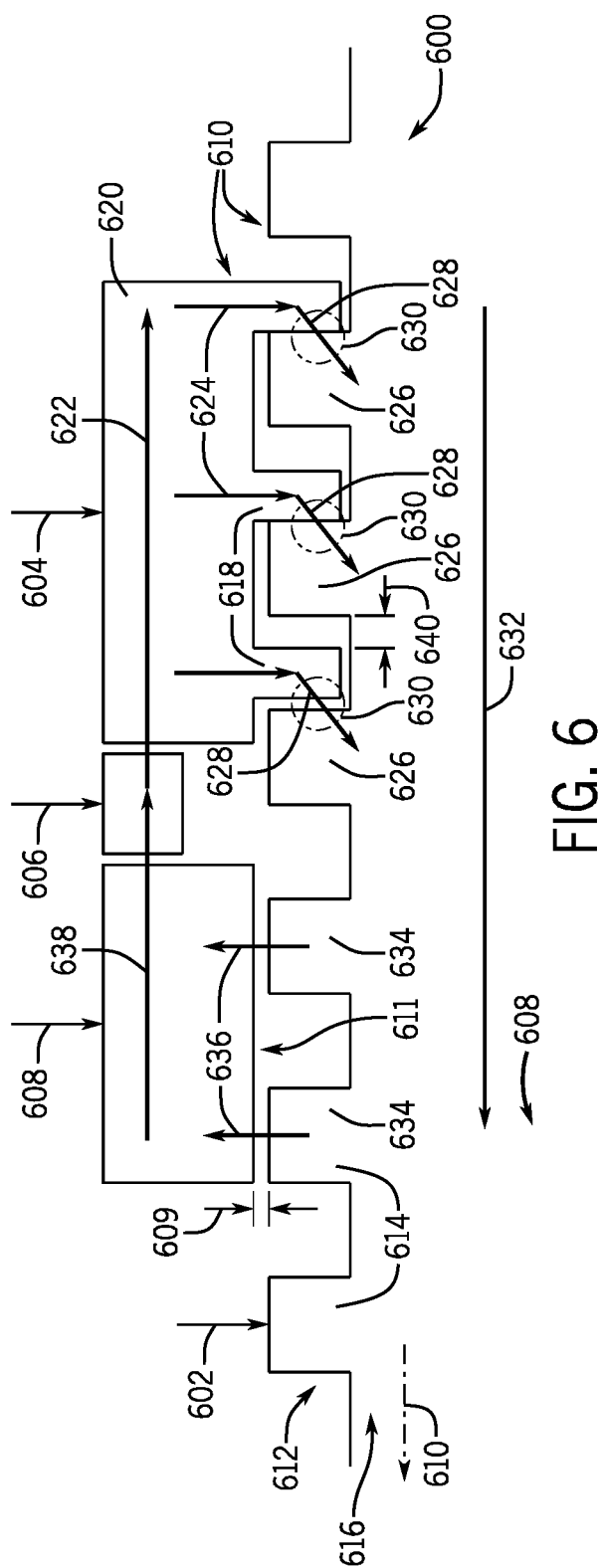
FIG. 6 is a cross-sectional, cutaway view of a screw-and-nut gear assembly, in which the screw-and-nut gear assembly is operated as part of a magnetically-assisted mechanical power transmission system in accordance with an additional example embodiment encompass herein.

Turning to FIG. 6, the present disclosure is not limited to gear assemblies but also encompasses other forms of assemblies, including for example assemblies involving screws, bolts, and nuts. In this regard, FIG. 6 particularly shows a cross-sectional, cutaway view of a screw-and-nut gear assembly 600 that includes a lead screw 602 and a ferromagnetic nut 604, as well as a MMF source 606 and a hollow cylinder 608. The particular cross-section that is shown in FIG. 6 can be understood to be taken along a mid-plane passing through a central axis 610 of the lead screw 602, which coincides with central axes of each of the ferromagnetic nut 604, the MMF source 606, and the hollow cylinder 608. FIG. 6 particularly shows portions 612 of the assembly 600 that are positioned above the central axis 610 as illustrated in FIG. 6. The portions of the assembly 600 that are cut away and not shown in FIG. 6 are those which would be positioned below the central axis 610 as illustrated in FIG. 6.

The portions 612 of the assembly 600 that are shown in FIG. 6 particularly include first (e.g., male) threads 614 formed on the lead screw 602, and extending around a central shaft 616 of the lead screw, as well as complementary (e.g., female) threads 618 formed on the ferromagnetic nut 604, and extending along an inner perimeter of an annular exterior structure 620 of the ferromagnetic nut. Further as shown, the hollow cylinder 608, MMF source 606, and ferromagnetic nut 604 are distributed in series axially along the lead screw 602, with the MMF source being positioned axially in between the ferromagnetic nut 604 and the hollow cylinder 608. Also, an air gap 609 is formed in between the threads 614 of the lead screw 602 and an inner circumference (or interior annular surface) 611 of the hollow cylinder 608. It should be appreciated that the cutaway portions of the assembly 600 that are not shown in FIG. 6 would be identical to the portions 612, except insofar as the cutaway portions would be inverted relative to (e.g., a mirror image of) the portions 612 about the central axis 610, and also except insofar as the first threads 614 and complementary threads 618 of the cutaway portions would be shifted along the central axis 610 relative to the first threads 614 and complementary threads 618 of the portions 612.

Although the screw-and-nut gear assembly 600 is not a gear assembly, nevertheless the screw-and-nut gear assembly can operate in accordance with, or substantially in accordance with, the magnetic circuit 200 of FIG. 2. Indeed, in the screw-and-nut gear assembly 600, the MMF source 606 applies a magnetic field so as to generate magnetic flux that proceeds within and around the assembly 600, and between component parts thereof, so as to complete the magnetic circuit 200. More particularly as shown in FIG. 6, the magnetic flux generated by the MMF source 606 first proceeds axially, generally parallel or substantially parallel to the central axis 610, from the MMF source 606 into the annular exterior structure 620 of the ferromagnetic nut 604 as represented by a first arrow 622, and then proceeds radially inward into respective ones of the complementary threads 618 of the ferromagnetic nut as indicated by respective second arrows 624.

Further, the magnetic flux then crosses from the respective ones of the complementary threads 618 to respective neighboring ones 626 of the first threads 614 of the lead screw 602, as indicated by respective third arrows 628. As shown, the respective neighboring ones 626 of the first threads 614 of the lead screw 602 are those ones of the first threads that are closest to, in terms of axial positioning along the central axis 610, the respective complementary threads 618. Consequently, the magnetic flux passing between the respective complementary threads 618 and respective neighboring ones 626 of the first threads is at respective maximum levels at respective locations 630 between those respective pairs of threads and, correspondingly, the attractive magnetic forces between the ferromagnetic nut 604 and the lead screw 602 are strongest at those locations.

Upon reaching the lead screw 602 via the neighboring ones 626 of the first threads 614, the magnetic flux further passes axially through the central shaft 616 of the lead screw as indicated by a fourth arrow 632, with the direction of the fourth arrow 632 being opposite the direction of the first arrow 622. The magnetic flux proceeds in this direction axially until it arrives at additional ones 634 of the first threads 614 that are aligned with the hollow cylinder 608. Upon reaching the respective additional ones 634 of the first threads 614, the magnetic flux then passes radially outward through and out from the respective additional ones of the first threads and into the hollow cylinder 608 surrounding those first threads by way of the air gap 609, as indicated by respective fifth arrows 636. After entering the hollow cylinder 608, the magnetic flux then proceeds axially in the same direction as the first arrow 622, parallel to the central axis 610, and returns to the MMF source 606 as indicated a sixth arrow 638.

The magnetic flux imparted by the MMF source 606 through the magnetic circuit formed by the lead screw 602, ferromagnetic nut 604, and hollow cylinder 608 imposes attractive magnetic forces between the lead screw 602 and ferromagnetic nut 604 in a manner that biases contact between the first threads 614 and complementary threads 618 to one side of the mesh. More particularly, because the attractive magnetic forces are strongest at the locations 630, the respective complementary threads 618 in the present illustration tend to be biased so that respective left sides of those respective complementary threads approach respective right sides of the respective neighboring ones 626 of the first threads 614. Given these attractive magnetic forces, the screw-and-nut gear assembly 600 can be operated in a manner that avoids backlash movement (achieves zero backlash operation) or at least achieves reduced backlash movement.

More particularly, during operation, the ferromagnetic nut 604 may initially be applying mechanical force toward the left (as illustrated in FIG. 6), so that the respective complementary threads 618 push against the respective neighboring ones 626 of the first threads 614 of the lead screw 602 that are positioned immediately to the left of those respective complementary threads. Correspondingly, the respective neighboring ones 626 of the first threads 614 of the lead screw 602 can be considered to be applying mechanical force to the right (as illustrated in FIG. 6) against the respective complementary threads 618 that are positioned immediately to the right of those respective first threads. With such interaction, there exist gaps (or backlash regions) 640 separating the respective complementary threads 618 from respective other ones of the first threads 614 that are respectively on the opposite sides (e.g., right sides as illustrated in FIG. 6) of those respective complementary threads by comparison with the respective neighboring ones 626 of the first threads closest to those respective complementary threads.

Given such an arrangement, in a conventional screw-and-nut gear assembly, when the direction of mechanical force applied by either the nut or lead screw is reversed, the driving nut will travel through the backlash regions (e.g., the gaps 640) relative to the lead screw without corresponding incremental movement of the lead screw that might tend to maintain the backlash regions. However, in the present embodiment of FIG. 6, and assuming that the ferromagnetic nut 604 is providing the driving force, when the direction of applied mechanical force is reversed, the ferromagnetic nut will "pull" the lead screw 602 toward the right via the attractive magnetic force on the contact sides (e.g., the right sides of the neighboring ones 626 of the first threads 614) of the lead screw 602. Further, assuming that the applied mechanical force (and any other magnetic forces) is not so strong as to overcome the attractive magnetic force between the complementary threads 618 and the neighboring ones 626 of the first threads 614, the ferromagnetic (driving) nut 604 will continue to "pull" the lead screw 602 until the direction of force is reversed again. Thus, in this operational circumstance, the lead screw 602 will not be subject to a backlash region of non-movement.

Likewise, in the embodiment of FIG. 6 and assuming that it is the lead screw 602 that is providing driving force, if the lead screw switches from rotating in a first direction tending to cause the respective neighboring ones 626 of the first threads to mechanically push against the respective complementary threads 618 to rotating in the opposite direction, the respective complementary threads 618 will tend to be maintained alongside or near the respective neighboring ones 626 of the first threads 614 (which are respectively closest to those respective complementary threads). Thus, with respect to the embodiment of FIG. 6 and regardless of whether it is the ferromagnetic nut 604 or the lead screw 602 that is providing the driving force, even though there exist the gaps (or backlash regions) 640 separating the respective complementary threads 618 from the respective other ones of the first threads 614 that are respectively on the opposite sides (e.g., right sides as illustrated in FIG. 6) of those respective complementary threads by comparison with the respective neighboring ones 626 of the first threads closest to those respective complementary threads, the respective complementary threads 618 will not tend to move through or close those respective gaps 640 (albeit the gaps can vary in extent somewhat as the lead screw 602 rotates relative to the ferromagnetic nut 604).

Further in this regard, although additional magnetic flux lines exist between the respective complementary threads 618 and the respective other ones of the first threads 614 that are (as illustrated in FIG. 6) to the right of those respective complementary threads, the majority of magnetic flux will be concentrated along the paths of least reluctance where the respective complementary threads 618 of the ferromagnetic nut 604 are contacting (or closest to) the respective neighboring ones 626 of the first threads 614 of the lead screw 602. Correspondingly, there will be a greater flux density between the contacting/touching sides (e.g., the right sides as illustrated in FIG. 6) of the neighboring ones 626 of the first threads 614 of the lead screw 602 than between the non-touching sides of the respective first threads 614 that are respectively positioned to the right of the respective complementary threads 618 (e.g., the respective left sides of those respective first threads as illustrated in FIG. 6) at which the gaps 640 exist. Because magnetic force is proportional to flux density squared, the overall attractive magnetic force between the touching sides of the neighboring ones 626 of the first threads 614 of the lead screw 602 and the respective complementary threads 618 adjacent respectively thereto is much greater than the overall attractive magnetic force between the non-touching sides of the respective other ones of the first threads 614 and the respective complementary threads 618 that are on opposite sides of the respective gaps 640.

Notwithstanding the above discussion, if the driving mechanical force between the ferromagnetic nut 604 and the lead screw 602 (plus any additional magnetic forces) is in opposition to and greater than the attractive magnetic forces between the complementary threads 618 of the ferromagnetic nut 604 and the neighboring ones 626 of the first threads 614 of the lead screw 602, backlash movement can still occur. That is, if the driving mechanical force between the ferromagnetic nut 604 and the lead screw 602 (plus any additional magnetic forces) exceed the attractive magnetic forces between the respective complementary threads 618 and the respective neighboring ones 626 of the first threads 614, the ferromagnetic nut (and lead screw) will transiently travel through the gaps (backlash regions) 640. If this occurs, then a new equilibrium will be attained when the contact and non-contact sides of the interfacing complementary threads 618 and first threads 614 are swapped-when, instead of the left sides of the complementary threads 618 contacting the right sides of the neighboring ones 626 of the first threads 614, the right sides of the complementary threads contact the left sides of the respective other ones of the first threads 614 positioned on opposite sides of those complementary threads (assuming the arrangement illustrated in FIG. 6).

It should be appreciated that such a situation, in which backlash occurs, can be avoided by sizing the magnetic circuit (and correspondingly sizing the magnetic field applied by the MMF source 606) such that the amplitude of the overall magnetic force communicated between the complementary threads 618 and the neighboring ones 626 of the first threads 614 is greater than the maximum mechanical force the lead screw 602 will realize in operation relative to the ferromagnetic nut 604. Additionally, in alternate embodiments, the magnetic circuit can be sized appropriately for a lower volume and mass than that required for the maximum operating force/torque, still eliminating backlash under part-load conditions but allowing backlash above a reversing backlash force threshold. This sizing method can be desirable for systems that are configured to apply large forces for fast response times but also to apply lower forces in alternating directions to move in small increments to reject disturbances and provide precise positioning in a localized region where the holding force is smaller than the maximum force.

Further with reference to the screw-and-nut gear assembly 600 of FIG. 6, it should also be appreciated that, depending upon the embodiment, the air gap 609 can be adjustable during the manufacturing or assembly of the screw-and-nut gear assembly 600. More particularly, the air gap 609 can be adjusted based upon the selection and/or implementation of the hollow cylinder 608, for example, by changing the inner circumference 611 of the hollow cylinder 608 (e.g., the inner diameter surrounding the first threads 614 of the lead screw 602) or the axial location of the hollow cylinder. By adjusting the air gap 609 in any of these manners, this can result in adjustments to the maximum torque achievable before backlash occurs. That is, such adjustments allow for the maximum anti-backlash torque level to be set during assembly.

Figure 7:
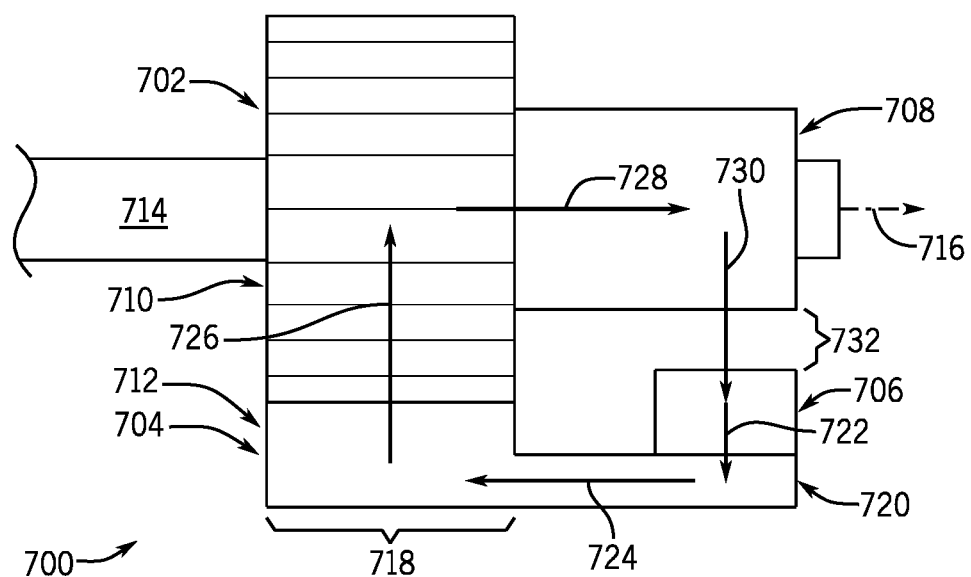
FIG. 7 is a side elevation view of a rack and pinion gear assembly, in which the rack and pinion gear assembly is operated as part of a magnetically-assisted mechanical power transmission system in accordance with an additional example embodiment encompass herein.

Referring next to FIG. 7, additional embodiments encompassed herein can relate to other types of gear assemblies or assemblies that involve intermeshed gear teeth. More particularly in this regard, FIG. 7 particularly shows a side elevation view of a rack and pinion gear assembly 700 that includes a ferromagnetic pinion 702 and a ferromagnetic rack 704, as well as a MMF source 706 and a ferromagnetic hollow cylinder 708. Further as shown, the pinion 702 includes pinion gear teeth 710 and the rack 704 includes rack gear teeth 712 that interface with the pinion gear teeth. Additionally, FIG. 7 shows that both the pinion 702 and the hollow cylinder 708 are supported upon a shaft 714 and positioned coaxially with respect to a central axis 716 of the shaft, with the hollow cylinder also being shifted axially along the central axis relative to the pinion. Although the rack gear teeth 712 of the rack 704 are generally positioned alongside the pinion 702 and have a length 718 that is equal or substantially equal to the axial length of the pinion 702, in the present embodiment the rack also includes a ferromagnetic (or simply magnetic) iron extension 720 that generally extends parallel to the central axis 716 alongside the hollow cylinder 708. The MMF source 706 is positioned in between the hollow cylinder 708 and the magnetic iron extension 720.

Further with respect to the rack 704, it should be appreciated that the rack is generally an elongated, flat structure that extends inwardly into (and/or out of) the page as shown in FIG. 7 and that supports numerous ones of the rack gear teeth 712 along the length of that structure into (and/or out of) the page. Given this arrangement of the rack gear teeth 712, it should be appreciated that there are some differences between the rack and pinion gear assembly 700 of FIG. 7 and the gear assembly 100 of FIG. 1 in terms of the gear teeth of the two assemblies. More particularly, in addition to having the rack gear teeth 712 arranged along a straight support structure instead of being arranged along the curved periphery of a gear as is the case with both the driving gear teeth 106 and driven gear teeth 110, the respective shapes of one or both of the rack gear teeth 712 and the pinion gear teeth 710 may also be modified from the shapes of the driving and driven gear teeth 106 and 110 to facilitate intermeshing of those rack and pinion gear teeth. The present embodiment is intended to encompass either of two operational implementations, in which either the rack 704 can exert mechanical force upon the pinion 702 to drive rotation of the pinion, or the pinion 702 can exert mechanical force to drive linear movement of the rack 704.

It should be understood that the rack and pinion gear assembly 700 also can operate in accordance with, or substantially in accordance with, the magnetic circuit 200 of FIG. 2. Indeed, in the rack and pinion gear assembly 700, the MMF source 706 applies a magnetic field so as to generate magnetic flux that proceeds within and around the assembly 700, and between component parts thereof, so as to complete the magnetic circuit 200. More particularly as shown in FIG. 7, the magnetic flux generated by the MMF source 706 first proceeds from the MMF source into the magnetic iron extension 720 of the rack 704 as represented by a first arrow 722, and then proceeds through the magnetic iron extension to the rack gear teeth 712 as indicated by a second arrow 724. Further, the magnetic flux then crosses from the rack gear teeth 712 to the pinion gear teeth 710 (the contacting gear mesh) as indicated by a third arrow 726. Upon reaching the pinion gear teeth 710, the magnetic flux then passes axially from the pinion 702 to the hollow cylinder 708, as indicated by a fourth arrow 728. After entering the hollow cylinder 708, the magnetic flux then proceeds radially outward toward and to, so as to return to, the MMF source 706, as indicated by a fifth arrow 730. In the present example embodiment, an air gap 732 exists between the hollow cylinder 708 and the MMF source 706, such that the magnetic flux proceeding from the hollow cylinder to the MMF source as represented by the fifth arrow 730 also proceeds through the air gap.

It should be recognized that, due to the magnetic flux imparted by the MMF source 706 through the magnetic circuit formed by the pinion 702, the rack 704 (including the magnetic iron extension 720), and the hollow cylinder 708 (and including the air gap 732), operation of the rack and pinion gear assembly 700 can achieve zero backlash operation, or at least operation that involves significantly less backlash movement than would otherwise occur in conventional arrangements. Such operation can be achieved in substantially the same manner as described above in regard to FIG. 1, if one assumes that the driven gear teeth 110 of the driven gear 104 constitute the pinion gear teeth 710 of the pinion 702 and also that the driving gear teeth 106 of the driving gear 102 are modified so as to be arranged in the manner of the rack gear teeth 712 of the rack 704 (such that those gear teeth are spaced along a straight support structure rather around the curved periphery of a gear), or vice-versa. That is, operation involving no backlash movement or reduced levels of backlash movement can be achieved in the rack and pinion gear assembly 700 including the MMF source 706 in substantially the same manner as described in regard to FIG. 1 if one assumes that either the pinion gear teeth 710 respectively take the place of the driving gear teeth 106 in terms of imparting mechanical force, and the rack gear teeth 712 respectively take the place of the driven gear teeth 110 in terms of receiving the imparted mechanical force, or vice-versa.

Regardless of whether it is the pinion gear teeth 710 or the rack gear teeth 712 that correspond to the driving gear teeth 106 in terms of imparting mechanical force, as described in regard to FIG. 1 there will be locations (typically one location corresponding to the location 132 of FIG. 1 at any given time) at which certain ones of the pinion gear teeth 710 and rack gear teeth 712 come into contact with one another. At these locations at which contact occurs, maximum flux will flow between the contacting ones of the pinion gear teeth 710 and rack gear teeth 712. Even though additional magnetic flux lines will exist at other locations between non-contacting sides of various ones of the pinion gear teeth 710 and rack gear teeth 712, the majority of flux will be concentrated along the path of least reluctance where the rack 704 and pinion 702 are touching. Therefore, there will be a greater flux density on the touching side of the rack and pinion mesh than the non-touching side.

Correspondingly, maximum attractive magnetic forces will occur between those respective contacting ones of the pinion gear teeth 710 and rack gear teeth 712, along the respective sides of the contacting ones of the teeth that are in contact with one another (e.g., along respective sides of the contacting ones of the teeth that correspond to the counter-clockwise-facing sides 116 and 120 in FIG. 1). Indeed, as discussed above, because force is proportional to flux density squared, the attractive magnetic force on the touching sides of the rack and pinion gear teeth 712 and 710 is much greater than that existing between the non-touching sides. Thus, even though there will be a gap existing between certain non-contacting ones of the rack and pinion gear teeth 712, 710 corresponding to the gap 124 shown in FIG. 1, backlash movement will not occur due to relative movement of the rack and pinion gear teeth (as could occur in a conventional rack and pinion gear assembly) when the direction of movement by the force-imparting gear teeth (whether of the pinion 702 or the rack 704) switches, provided that the attractive magnetic force between the contacting gear teeth is not exceeded by other forces.

Further with reference to the rack and pinion gear assembly 700 of FIG. 7, it should also be appreciated that, depending upon the embodiment, the air gap 732 can be adjustable during the manufacturing or assembly of the rack and pinion gear assembly 700. More particularly, the air gap 732 can be adjusted based upon the selection and/or implementation of the hollow cylinder 708, for example, by changing the diameter of the hollow cylinder or the axial location of the hollow cylinder. By adjusting the air gap 732 in any of these manner, this can result in adjustments to the maximum torque achievable before backlash movement occurs. That is, such adjustments allow for the maximum anti-backlash torque level to be set during assembly.

Figure 8:
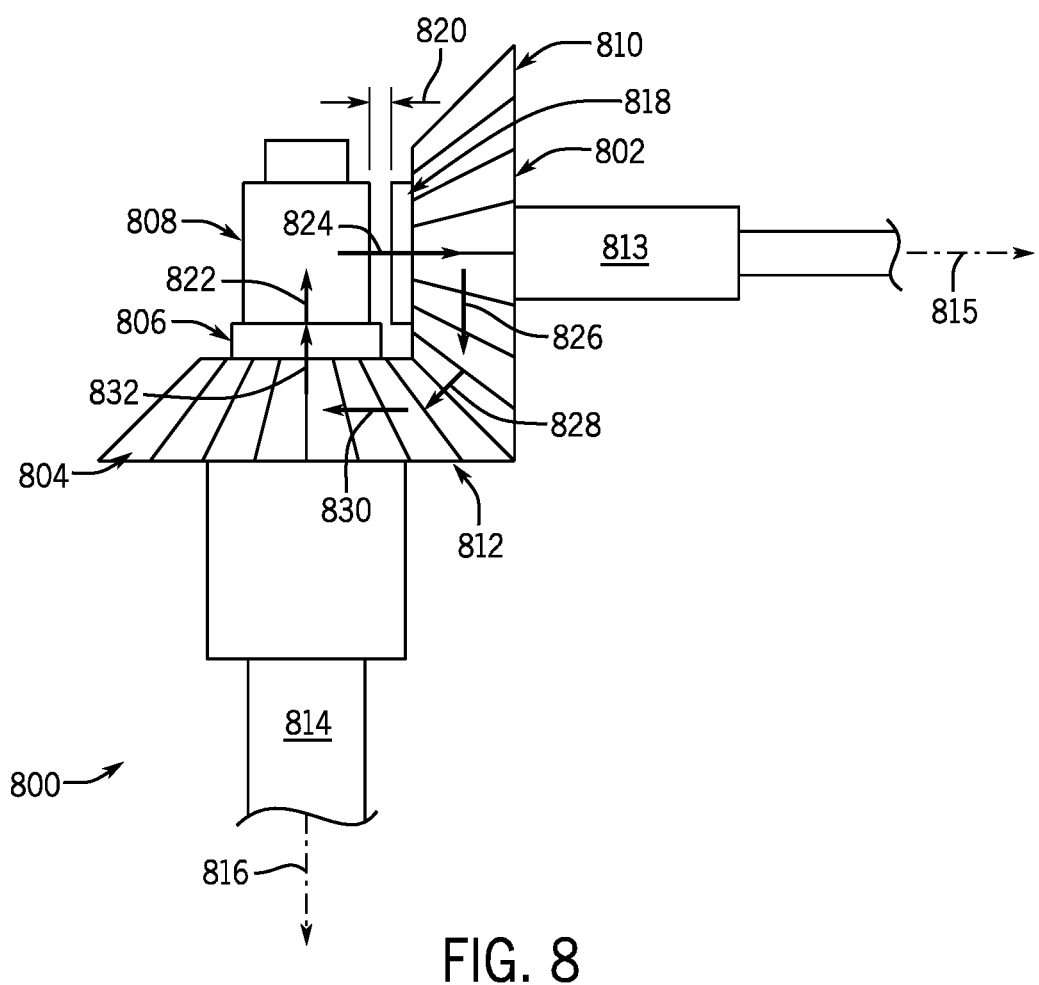
FIG. 8 is a side elevation view of a bevel gear assembly, in which the gear assembly is operated as part of a magnetically-assisted mechanical gear system, in accordance with an additional example embodiment encompassed herein.

In a further example embodiment of an assembly involving intermeshed gear teeth, FIG. 8 shows a side elevation view of a bevel gear assembly 800 that includes a first ferromagnetic bevel gear 802 and a second ferromagnetic bevel gear 804, as well as a MMF source 806 and a ferromagnetic hollow cylinder 808. Further as shown, the first bevel gear 802 includes first bevel gear teeth 810 and the second bevel gear 804 includes second bevel gear teeth 812 that interface with the first bevel gear teeth. The first bevel gear 802 is supported upon and coaxial with a first shaft 813 that extends along a first central axis 815. Each of the second bevel gear 804, the MMF source 806, and the hollow cylinder 808 are supported upon a second shaft 814 and positioned coaxially with respect to a second central axis 816 of the second shaft. The first and second central axes 815 and 816 are perpendicular (or, in other embodiments, substantially or largely perpendicular, or oblique) to one another and within the same plane, and the hollow cylinder 808 is positioned axially sufficiently far along the second central axis 816 that the first central axis 815 passes through the hollow cylinder. The MMF source 806 is located along the second central axis 816 at a location in between the second bevel gear 804 and the hollow cylinder 808.

Additionally as shown, given the relative positioning of the first central axis 815 relative to the second central axis 816, the first bevel gear 802 and second bevel gear 804 also are positioned relative to one another at right angles (or, in alternate embodiments, substantially or largely at right angles). Further, the first bevel gear 802 and second bevel gear 804 are respectively positioned along the first central axis 815 and the second central axis 816 so that the first bevel gear teeth 810 mesh with the second bevel gear teeth 812. Additionally in the present embodiment a cylindrical magnetic iron surface (or structure) 818 is supported upon the first shaft 813 and positioned coaxially along the first central axis 815 at a location between the first bevel gear 802 and the hollow cylinder 808. Although the cylindrical magnetic iron surface 818 is positioned adjacent to, so as to be in contact with, the first bevel gear 802, an air gap 820 exists in between the hollow cylinder 808 and the cylindrical magnetic iron surface 818. It will be appreciated that the components shown in FIG. 8 are supported relative to one another by one or more support structures (not shown).

The bevel gear assembly 800 also can operate in accordance with, or substantially in accordance with, the magnetic circuit 200 of FIG. 2. Indeed, in the bevel gear assembly 800, the MMF source 806 applies a magnetic field so as to generate magnetic flux that proceeds within and around the assembly 800, and between component parts thereof, so as to complete the magnetic circuit 200. More particularly as shown in FIG. 8, the magnetic flux generated by the MMF source 806 first proceeds from the MMF source into the hollow cylinder 808 as represented by a first arrow 822, and then proceeds from the hollow cylinder through the air gap 820 and then through the cylindrical magnetic iron surface 818 and to the first bevel gear 802 as indicated by a second arrow 824, generally in an axial manner along or parallel to the first central axis 815. Further, the magnetic flux then proceeds radially outward within the first bevel gear 802 as represented by a third arrow 826 and then crosses from the first bevel gear teeth 810 to the second bevel gear teeth 812 (the contacting gear mesh) as indicated by a fourth arrow 828. Upon reaching the second bevel gear teeth 812, the magnetic flux then proceeds radially inward within the second bevel gear 804 as represented by a fifth arrow 830, and then proceeds axially from the second bevel gear 804 back to the MMF source 806, generally in an axial manner along or parallel to the second central axis 816 as indicated by a sixth arrow 832.

It should be recognized that, due to the magnetic flux imparted by the MMF source 806 through the magnetic circuit formed by the hollow cylinder 808, cylindrical magnetic iron surface 818, first bevel gear 802, and second bevel gear 804 (and including the air gap 820), operation of the bevel gear assembly 800 can achieve zero backlash operation, or at least operation that involves significantly less backlash movement than would otherwise occur in conventional arrangements. Such operation can be achieved in substantially the same manner as described above in regard to FIG. 1, if one assumes that the driving gear teeth 106 of the driving gear 102 constitute the first bevel gear teeth 810 of the first bevel gear 802 and also that the driven gear teeth 110 of the driven gear 104 constitute the second bevel gear teeth 812 of the second bevel gear 804, or vice-versa. That is, operation involving no backlash movement or reduced levels of backlash movement can be achieved in the bevel gear assembly 800 including the MMF source 806 in substantially the same manner as described in regard to FIG. 1 if one assumes that either the first bevel gear teeth 810 respectively take the place of the driving gear teeth 106 in terms of imparting mechanical force, and the second bevel gear teeth 812 respectively take the place of the driven gear teeth 110 in terms of receiving the imparted mechanical force, or vice-versa.

Regardless of whether it is the first bevel gear teeth 810 or the second bevel gear teeth 812 that correspond to the driving gear teeth 106 in terms of imparting mechanical force, as described in regard to FIG. 1 there will be locations (typically one location corresponding to the location 132 of FIG. 1 at any given time) at which certain ones of the first bevel gear teeth 810 and second bevel gear teeth 812 come into contact with one another. At these locations at which contact occurs, maximum flux will flow between the contacting ones of the first bevel gear teeth 810 and second bevel gear teeth 812. Even though additional magnetic flux lines will exist at other locations between non-contacting sides of various ones of the first bevel gear teeth 810 and second bevel gear teeth 812, the majority of flux will be concentrated along the path of least reluctance where the first and second bevel gears 802 and 804 are touching. Therefore, there will be a greater flux density on the touching side of the bevel gear mesh than the non-touching side.

Correspondingly, maximum attractive magnetic forces will occur between those respective contacting ones of the first bevel gear teeth 810 and second bevel gear teeth 812, along the respective sides of the contacting ones of the teeth that are in contact with one another (e.g., along respective sides of the contacting ones of the teeth that correspond to the counter-clockwise-facing sides 116 and 120 in FIG. 1). Indeed, as discussed above, because force is proportional to flux density squared, the attractive magnetic force on the touching sides of the first bevel gear teeth 810 and second bevel gear teeth 812 is much greater than that existing between the non-touching sides of the gears/gear teeth. Thus, even though there will be a gap existing between certain non-contacting ones of the first bevel gear teeth 810 and second bevel gear teeth 812 corresponding to the gap 124 shown in FIG. 1, backlash movement will not occur due to relative movement of the first bevel gear teeth 810 and second bevel gear teeth 812 (as could occur in a conventional bevel gear assembly) when the direction of movement by the force-imparting bevel gear teeth (whether of the first bevel gear 802 or the second bevel gear 804) switches, provided that the attractive magnetic force between the contacting gear teeth is not exceeded by other forces.

Further with reference to the gear assembly 800 of FIG. 8, it should also be appreciated that, depending upon the embodiment, the air gap 820 can be adjustable during the manufacturing or assembly of the gear assembly 800. More particularly, the air gap 820 can be adjusted based upon the selection and/or implementation of the hollow cylinder 808, for example, by changing the diameter of the hollow cylinder or the axial location of the hollow cylinder. By adjusting the air gap 820 in any of these manner, this can result in adjustments to the maximum torque achievable before backlash movement occurs. That is, such adjustments allow for the maximum anti-backlash torque level to be set during assembly.

Figure 9:
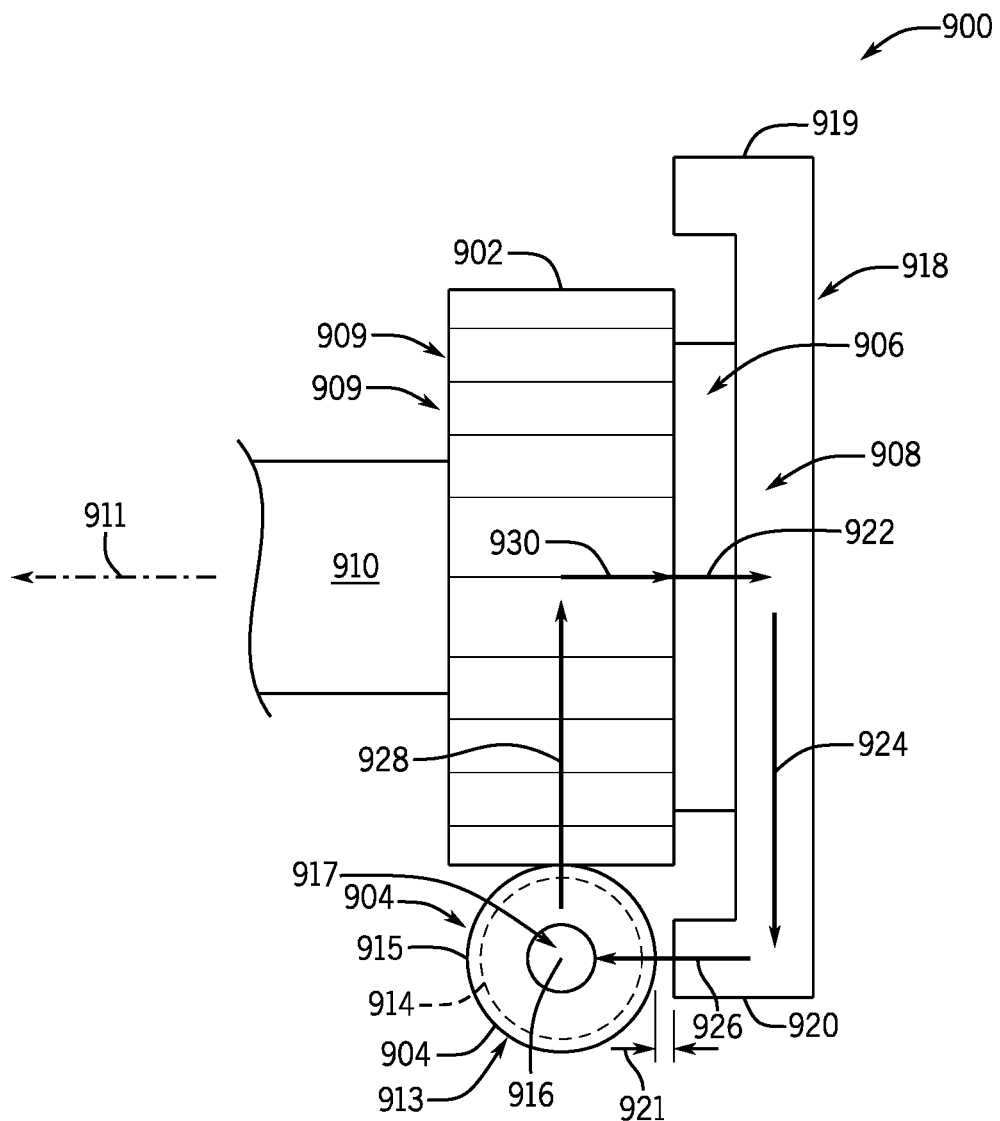
FIG. 9 and FIG. 10 respectively are side elevation views of two different worm gear assemblies, respectively, which employ two different flux-conducting structures, respectively, in accordance with two additional example embodiments encompassed herein, respectively.

In a further example embodiment of an assembly involving intermeshed gear teeth, FIG. 9 shows a side elevation view of a worm gear assembly 900 that includes a ferromagnetic first gear 902, which can be a spur gear, and a ferromagnetic worm gear 904, as well as a MMF source 906 and a ferromagnetic flux-conducting structure 908. Further as shown, the first gear 902 includes gear teeth 909 and is supported upon a first shaft 910 that extends along a first central axis 911. In addition, the MMF source 906 is supported upon the first shaft 910 between the first gear 902 and the flux-conducting structure 908 (alternatively, the MMF source 906 can be rigidly affixed to the flux-conducting structure, and the first shaft 910 and first gear 902 can be rotatably mounted to the flux-conducting structure). Both the MMF source 906 and the first gear 902 are coaxially arranged about the central axis 911.

Additionally, the worm gear 904 includes threads 913 that extend around the worm gear, and that particularly are formed by helical ridges that extend outward from inner valleys 914 (shown in phantom) to an outer periphery 915 of the worm gear. The worm gear 904 (including the threads 913) is supported upon a second shaft 916, and both are configured to rotate about (and are coaxial with) a second central axis 917. The first and second central axes 911 and 917 are perpendicular to one another and offset from one another, so that the threads 913 of the worm gear 904 interface and mesh with the gear teeth 909 of the first gear 902. The flux-conducting structure 908 in the present embodiment is C-shaped, and the MMF 906 is positioned adjacent to a middle section 918 of the flux-conducting structure, between first and second brackets 919 and 920, respectively. Although the MMF 906 is positioned adjacent to the middle section 918 of the flux-conducting structure 908, the worm gear 904 is positioned alongside the second bracket 920 of the flux-conducting structure. In the present embodiment, the position of the second bracket 920 relative to the worm gear 904 is at 90 degrees or substantially 90 degrees rotated about the second central axis 917 relative to the position at which the worm gear 904 interfaces the first gear 902. Further, an air gap 921 exists in between the worm gear 904 and the second bracket 920 of the flux-conducting structure 908.

It should be understood that the worm gear assembly 900 also can operate in accordance with, or substantially in accordance with, the magnetic circuit 200 of FIG. 2. Indeed, in the worm gear assembly 900, the MMF source 906 applies a magnetic field so as to generate magnetic flux that proceeds within and around the assembly 900, and between component parts thereof, so as to complete the magnetic circuit 200. More particularly as shown in FIG. 9, the magnetic flux generated by the MMF source 906 first proceeds from the MMF source into the middle section 918 of the flux-conducting structure 908, as indicated by a first arrow 922, and then proceeds through the flux-conducting structure from the middle section to the second bracket 920, as indicated by a second arrow 924. Next, the magnetic flux travels through the second bracket 920, across the air gap 921, and into the worm gear 904, as represented by a third arrow 926. Further, the magnetic flux additionally travels from the threads 913 of the worm gear 904 to the gear teeth 909 of the first gear 902 (through the contact mesh) and radially inward toward the first central axis 911, as represented by a fourth arrow 928. Finally, the magnetic flux then travels generally along the first central axis 911 from the first gear 902 back to the MMF source 906, as indicated by a fifth arrow 930.

It should be recognized that, due to the magnetic flux imparted by the MMF source 906 through the magnetic circuit formed by the first gear 902, worm gear 904, and flux-conducting structure 908 (and including the air gap 921), operation of the worm gear assembly 900 can achieve zero backlash operation, or at least operation that involves significantly less backlash movement than would otherwise occur in conventional arrangements. Such operation can be achieved a manner that is similar to that described above in regard to FIGS. 1 and 6. More particularly, it will be appreciated that the worm gear assembly 900 generally operates in a manner in which the threads 913 of the worm gear 904 when turning impart mechanical force upon the gear teeth 909 of the first gear 902.

As described in regard to FIG. 1 and FIG. 6 (and particularly FIG. 6), there will be locations at which certain respective sides of certain respective ones of the threads 913 of the worm gear 904 come into contact with certain respective sides of certain respective ones of the gear teeth 909 of the first gear 902. Further, the magnetic flux imparted by the MMF source 906 through the magnetic circuit formed by the first gear 902, worm gear 904, and flux-conducting structure 908 imposes attractive magnetic forces between the threads 913 of the worm gear 904 and the gear teeth 909 of the first gear 902 in a manner that biases contact between those threads and gear teeth, to one side of the mesh. In particular, the attractive magnetic forces are strongest at the aforementioned locations at which contact between the certain respective sides of the certain respective ones of the threads 913 of the worm gear 904 and the certain respective sides of the certain respective ones of the gear teeth 909 are in contact (e.g., at locations corresponding to the locations 630 of FIG. 6). Consequently, those certain respective sides of those certain respective ones of the threads 913 will tend to be biased to remain in contact with those certain respective sides of those certain respective ones of the respective gear teeth 909 with which those certain respective ones of the threads are in contact. Given these attractive magnetic forces, the worm gear assembly 900 can be operated in a manner that avoids backlash movement (achieves zero backlash operation) or at least achieves reduced backlash movement.

More particularly with respect to the illustration provided by FIG. 9, during operation the worm gear 904 initially may be applying mechanical force in a direction into the page (as illustrated in FIG. 9), where respective threads 913 of the worm gear push against respective ones of the gear teeth 909 that are positioned immediately inwardly of those respective threads (again as illustrated in FIG. 9). With such interaction, there will exist gaps (or backlash regions) separating the respective threads 913 of the worm gear 904 from respective other ones of the gear teeth 909 that are respectively positioned on the opposite sides of those respective threads, that is, respectively positioned outwardly of those respective threads (again as illustrated in FIG. 9) rather than respectively positioned immediately inwardly of those respective threads as in the case of the respective ones of the gear teeth 909 with which those respective threads are in contact.

Given such an arrangement, in a conventional worm gear assembly, when the direction of applied mechanical force is reversed, the threads of the worm gear 904 will travel through the backlash regions (e.g., corresponding to the gaps 640 of FIG. 6) without incremental movement of the first gear 902. However, in the present embodiment of FIG. 9 in which the MMF source 906 together with the first gear 902, worm gear 904, and flux-conducting structure 908 (along with the air gap 921) form a magnetic circuit, when the direction of applied mechanical force is reversed, the threads of the worm gear 904 will "pull" the first gear 902 via the attractive magnetic force on the contact sides of the threads 913 of the worm gear. That is, if the worm gear 904 switches from rotating in a first direction tending to cause the respective threads 913 of the worm gear to mechanically push against the respective ones of the gear teeth 909 to rotating in the opposite direction, contact between the respective threads and the respective ones of the gear teeth 909 will tend to be maintained.

Further in this operational circumstance, assuming that the applied mechanical force (and any other magnetic forces) is not so strong as to overcome the attractive magnetic force between the respective threads 913 of the worm gear 904 and the respective ones of the gear teeth 909 with which those threads are in contact, the threads of the worm gear will continue to "pull" the first gear 902 until the direction of rotation of the worm gear (and associated force imparted by the worm gear) is reversed again. Thus, in this operational circumstance, the first gear 902 will not be subject to a backlash region of non-movement. Indeed, even though there exist the respective gaps (or backlash regions corresponding to the backlash regions 640) separating the respective threads 913 of the worm gear 904 from the other ones of the gear teeth 909 that are respectively on the opposite sides of those respective threads by comparison with the respective ones of the gear teeth closest to those respective threads, the respective threads will not tend to move through or close those respective gaps (albeit the gaps can vary in extent somewhat as the worm gear 904 rotates relative to the first gear 902).

Further in this regard, although additional magnetic flux lines exist between the respective threads 913 of the worm gear 904 and the respective other ones of the gear teeth 909 that are respectively separated from those respective threads by the respective gaps, the majority of magnetic flux will be concentrated along the paths of least reluctance where the respective threads of the worm gear are contacting (or closest to) the respective ones of the gear teeth 909. Correspondingly, there will be a greater flux density between the contacting/touching sides of the respective threads 913 of the worm gear 904 and respective ones of the gear teeth 909 with which those respective threads are in contact than between the non-contacting/non-touching sides of the respective threads and the respective other ones of the gear teeth at which the respective gaps exist. Because magnetic force is proportional to flux density squared, the overall attractive magnetic force between the touching sides of the respective threads 913 of the worm gear 904 and the respective ones of the gear teeth 909 adjacent respectively thereto is much greater than the overall attractive magnetic force between the non-touching sides of the respective threads 913 of the worm gear and the respective other ones of the gear teeth 909 that are separated from those respective threads by the respective gaps.

Notwithstanding the above discussion, if the driving mechanical force between the worm gear 904 and the first gear 902 (plus any additional magnetic forces) is in opposition to and greater than the attractive magnetic forces between the respective threads 913 of the worm gear and the respective ones of the gear teeth 909 closest to those respective threads, backlash movement can still occur. That is, if the driving mechanical force between the worm gear 904 and the first gear 902 (plus any additional magnetic forces) exceed the attractive magnetic forces between the respective threads 913 of the worm gear and the respective ones of the gear teeth 909 closest to those respective threads, the worm gear will transiently travel through the gaps (backlash regions). If this occurs, then a new equilibrium will be attained when the contact and non-contact sides of the respective threads 913 and gear teeth 909 are swapped.

It should be appreciated that such a situation, in which backlash occurs, can be avoided by sizing the magnetic circuit (and correspondingly sizing the magnetic field applied by the MMF source 906) such that the amplitude of the overall magnetic force communicated between the respective threads 913 of the worm gear 904 and the respective ones of the gear teeth 909 closest to those respective threads is greater than the maximum mechanical force the first gear 902 will realize in operation relative to the worm gear 904. Additionally, in alternate embodiments, the magnetic circuit can be sized appropriately for a lower volume and mass than that required for the maximum operating force/torque, still eliminating backlash under part-load conditions but allowing backlash above a reversing backlash force threshold. This sizing method can be desirable for systems that are configured to apply large forces for fast response times but also to apply lower forces in alternating directions to move in small increments to reject disturbances and provide precise positioning in a localized region where the holding force is smaller than the maximum force.

Figure 10:
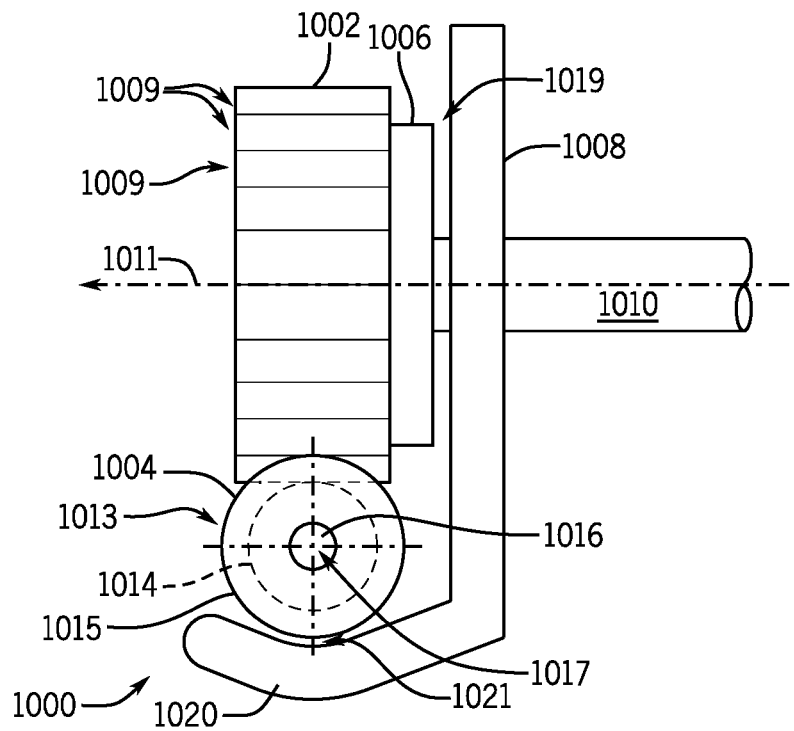

Referring to FIG. 10, it should be appreciated that the present disclosure encompasses other embodiments of worm gear assemblies in addition to the worm gear assembly 900 of FIG. 9, such as a worm gear assembly 1000. As shown, the worm gear assembly 1000 of FIG. 10 is similar to the worm gear assembly 900 of FIG. 9 in that the worm gear assembly 1000 also includes a ferromagnetic first gear 1002, a ferromagnetic worm gear 1004, a MMF source 1006, and a flux-conducting structure 1008, which respectively correspond to the first gear 902, the worm gear 904, the MMF source 906, and the flux-conducting structure 908 of FIG. 9. The first gear 1002 includes gear teeth 1009, the MMF source 1006 again is supported adjacent to the first gear 1002 on a first shaft 1010, and all of the MMF source, first gear, and first shaft are positioned coaxially about a first central axis 1011. Additionally, the worm gear 1004 includes threads 1013 that extend around the worm gear, and that particularly are formed by helical ridges that extend outward from inner valleys 1014 (shown in phantom) to an outer periphery 1015 of the worm gear. The worm gear 1004 (including the threads 1013) is supported upon a second shaft 1016, and both are configured to rotate about a second central axis 1017. The first and second central axes 1011 and 1017 are perpendicular to one another and offset from one another, so that the threads 1013 of the worm gear 1004 interface and mesh with the gear teeth 1009 of the first gear 1002 in the same or substantially the same manner as the threads 913 of the worm gear 904 interface and mesh with the gear teeth 909 of the first gear 902 of FIG. 9.

However, in contrast to the worm gear assembly 900, the flux-conducting structure 1008 of the worm gear assembly 1000 is L-shaped rather than C-shaped. More particularly, the flux-conducting structure 1008 includes a bracket 1020 that extends around the worm gear 1004, along a side of the worm gear opposite the side of the worm gear that interfaces the first gear 1002, such that the worm gear is positioned in between the bracket 1020 and the first gear 1002. Consequently, although the air gap 921 in FIG. 9 is located at a position that is 90 degrees or substantially 90 degrees relative to the position at which the worm gear 904 interfaces the first gear 902, in the worm gear assembly 1000 of FIG. 10 a first air gap 1021 exists in between the worm gear 1004 and the bracket 1020 at a position that is 180 degrees or substantially 180 degrees relative to the position at which the worm gear 1004 interfaces the first gear 1002.

Also, in contrast to the worm gear assembly 900, in the worm gear assembly 1000 of FIG. 10 the MMF source 1006 is separated from the flux-conducting structure 1008 by way of an additional (second) air gap 1019. That is, even though the first gear 1002 and MMF source 1006 are supported upon the first shaft 1010 and even though the first shaft extends through and is supported relative to the flux-conducting structure 1008, there is an additional physical space constituting the second air gap 1019 that exists between the MMF source 1006 and the flux-conducting structure 1008.

The worm gear assembly 1000 operates in nearly the same manner as the worm gear assembly 900. Again, the threads 1013 of the worm gear assembly 1000 can impart mechanical forces in relation to the gear teeth 1009 of the first gear 1002. Also, the worm gear assembly 1000 also can operate in accordance with, or substantially in accordance with, the magnetic circuit 200 of FIG. 2. Indeed, in the worm gear assembly 1000, the MMF source 1006 applies a magnetic field so as to generate magnetic flux that proceeds within and around the assembly 1000, and between component parts thereof, so as to complete the magnetic circuit 200. Further, as described in regard to the worm gear assembly 900 of FIG. 9, during operation of the worm gear assembly 1000 there will be locations at which certain respective sides of certain respective ones of the threads 1013 of the worm gear 1004 come into contact with certain respective sides of certain respective ones of the gear teeth 1009 of the first gear 1002. It is at these contacting sides at which magnetic flux communicated between, and associated attractive magnetic forces between, the worm gear 1004 and first gear 1002 are strongest. Thus, as with respect to the worm gear assembly 900, during operation of the worm gear assembly 1000, due to the attractive magnetic forces between the respective threads 1013 and the respective ones of the gear teeth 1009 with which those respective threads are in contact, contact between those respective threads and those respective ones of the gear teeth tends to be maintained notwithstanding changes in the rotational direction of the worm gear 1004. Correspondingly, backlash movement is avoided or reduced.

Notwithstanding the operational similarities between the worm gear assembly 900 and the worm gear assembly 1000, there are also several operational differences due to the differences in the configuration of the worm gear assembly 1000 relative to the worm gear assembly 900 as described above. As already described, the MMF source 1006 is positioned axially in line with the first gear 1002, and separated by the second air gap 1019 from the flux-conducting structure 1008 (which can be considered a ferromagnetic flux return path structure), where that flux-conducting structure is also separated from the worm gear 1004 by the first air gap 1021. Thus, in the worm gear assembly 1000, the magnetic flux path from and back to the MMF source 1006 passes through not only each of the first gear 1002, the worm gear 1004, the flux-conducting structure 1008, and the first air gap 1021 between the flux-conducting structure and the worm gear (which corresponds to the air gap 921 of the worm gear assembly 900), but also passes through the second air gap 1019 to complete the magnetic (flux) circuit.

Further, due to the shape of the flux-conducting structure 1008 in which the bracket 1020 extends around the worm gear 1004, a larger surface area (e.g., of a portion of the bracket 1020 facing the worm gear) is provided for magnetic flux transfer than is the case with the second bracket 920 of the worm gear assembly 900. Given this to be the case, it should be appreciated that, depending upon the embodiment, the flux-conducting structure (serving as a ferromagnetic flux return path structure) may be shaped to provide a larger (or smaller) surface area for flux transfer. The worm gear assembly 1000 can also entail a reduction in rotating mass by comparison with the worm gear assembly 900, which can be beneficial in terms of reducing system inertia.

Additionally with reference to the respective worm gear assemblies 900 and 1000 of FIGS. 9 and 10, respectively, it should also be appreciated that, depending upon the embodiment, one or more of the respective air gaps 921, 1019, and 1021 can be adjustable during the manufacturing or assembly of the respective gear assemblies 900 and 1000. More particularly, the air gap 921 can be adjusted based upon the selection and/or implementation (e.g., the shape) of the flux-conducting structure 908 or by adjusting some other parameter of the worm gear assembly 900, for example, by changing the diameter of the worm gear 904 or the axial alignment of the worm gear relative to the first gear 902 and/or the flux-conducting structure. Also, the first air gap 1021 can be adjusted based upon the selection and/or implementation (e.g., the shape) of the flux-conducting structure 1008 or by adjusting some other parameter of the worm gear assembly 1000, for example, by changing the diameter of the worm gear 1004 or the axial alignment of the worm gear relative to the first gear 1002 and/or the flux-conducting structure. Further, the second air gap 1019 also can be adjusted based upon the selection and/or implementation (e.g., the shape) of the flux-conducting structure 1008.

By adjusting the air gaps 921, 1019, and/or 1021 in any of these manners, this can result in adjustments to the maximum torque achievable before backlash movement occurs in the respective worm gear assembly 900 or worm gear assembly 1000, as applicable. That is, such adjustments allow for the maximum anti-backlash torque level(s) for the respective worm gear assemblies 900 and/or 1000 to be set during assembly.

Although each of the embodiments shown in and described in relation to FIGS. 1 through 10 envisions the generation of magnetic flux by one or more MMF sources that are distinct from the intermeshing gears or other corresponding interfacing structures (e.g., threads, nuts, racks, etc.) by which power transmission is achieved, the present disclosure is not limited to such mechanical gear or other power transmission systems. Rather, the present disclosure also is intended to encompass embodiments in which it is the intermeshing gears or other corresponding interfacing structures themselves that generate the magnetic flux. In at least some such embodiments, the intermeshing gears or other corresponding interfacing structures are manufactured from permanent magnet materials (or otherwise have permanent magnet materials integrated or included therewithin) so that those interfacing gears or corresponding structures exert magnetic forces relative to one another. Also, in at least some other embodiments, one or more electromagnets can be included within the intermeshing gears or other corresponding interfacing structures.

Figure 11:
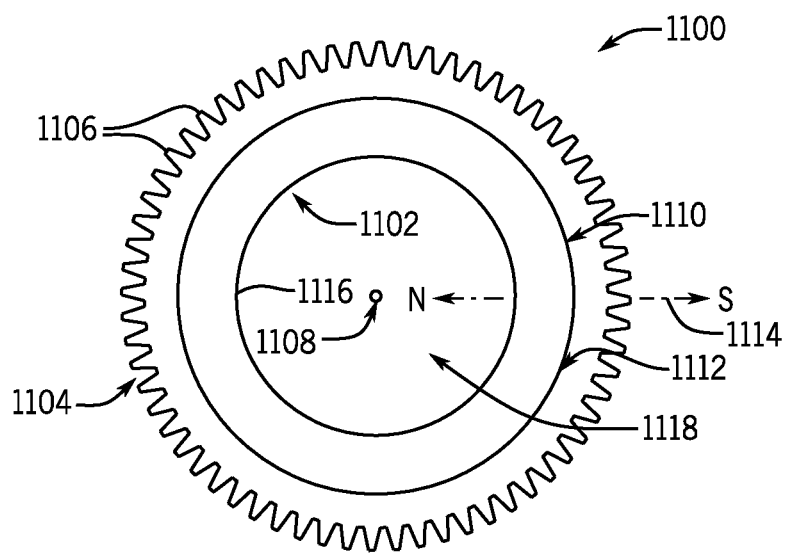
FIG. 11 is a side elevation view of an example permanent magnet gear taking the form of a spur gear that is formed by the combination of inner and outer portions, in accordance with an example embodiment encompassed herein.

In at least some embodiments, the present disclosure encompasses embodiments having a magnetically-assisted gear mesh, having a plurality of gears, wherein the gears are manufactured from permanent magnet materials. Referring to FIG. 11 in this regard, in at least some such embodiments, such gear assemblies employ permanent magnets taking the form of ring magnets. FIG. 11 particularly illustrates an example first permanent magnet gear 1100 that is formed by the combination of a first inner portion 1102 and a first outer portion 1104. As shown, the first inner portion 1102 in the present embodiment is annular and the first outer portion 1104 is substantially annular but also includes first outer gear teeth 1106 arranged along an outer circumference of the first outer portion. Both of the first inner portion 1102 and first outer portion 1104 are coaxially positioned about a first central axis 1108, with the first inner portion 1102 and first outer portion 1104 respectively being sized so that an outer circumference 1110 of the first inner portion 1102 is identical in size and adjacent to an inner circumference 1112 of the first outer portion 1104.

The first inner portion 1102 can be understood to form a first pole and the first outer portion 1104 can be understood to form a second pole having a polarity opposite to that of the first inner portion. For example, as illustrated in FIG. 11, the first pole associated with the first inner portion 1102 can be a north pole and the second pole associated with the first outer portion 1104 can be a south pole, although in other embodiments, there can be an opposite assignment of poles. Given this arrangement of poles among the first inner portion 1102 and first outer portion 1104, the first permanent magnet gear 1100 overall can be understood to have a polarity that is radially directed along radial axes extending radially outward from the first central axis 1108, including (for example) a first radial axis represented by an arrow 1114. At the same time, it should be appreciated that the illustration of the permanent magnet gear 1100 as having the first inner portion 1102 and the first outer portion 1104 is not provided to suggest that the permanent magnet gear 1100 necessarily has two distinct annular portions that are distinct structures. Rather, the first inner portion 1102 and first outer portion 1104 can be integrally formed as a single structure made from a single permanent magnet material serving as a single permanent magnet gear. Further, the junction between the first inner portion 1102 and first outer portion 1104 formed at the outer circumference 1110/inner circumference 1112 need not be a physical junction or physical attribute. Instead, the junction is merely provided to figuratively illustrate the existence of two concentric regions of the permanent magnet gear 1100, which are respectively associated with the first inner portion 1102 and the first outer portion 1104, at which are provided the first (e.g., north) and second (e.g., south) poles of the permanent magnet gear.

Further, given this overall polarity, it should be appreciated that magnetic flux lines generated by the first inner portion 1102 and first outer portion 1104 generally proceed radially outward through the first inner portion 1102 and first outer portion 1104 beyond the first outer gear teeth 1106, at all circumferential locations around the gear. The second (e.g., south) pole in the present embodiment can be understood to exist particularly at the outer tips of the first outer gear teeth 1106. Then the magnetic flux lines curve outward away from the first permanent magnet gear 1100, in a manner generally parallel to the first central axis 1108 on either side of the first permanent magnet gear 1100 (into and out of the page when viewing FIG. 11) and at all circumferential locations around the gear, and then proceed generally radially inwardly toward the first central axis 1108 on either side of the gear. Finally, upon reaching locations positioned radially inward of a first further inner circumference 1116 of the first inner portion 1102 (that is, closer to the first central axis 1108 than the further inner circumference), the magnetic flux lines then curve inward back toward the first permanent magnet gear 1100, again in a manner generally parallel to the first central axis 1108 (out of and into the page when viewing the FIG. 11). Upon the magnetic flux lines reaching a first interior region 1118 within the first permanent magnet gear 1100, within the first further inner circumference 1116 of the first inner portion 1102, the magnetic flux lines then proceed generally radially outward again into the first inner portion 1102 at the first further inner circumference 1116, at which can be understood to exist the first (e.g., north) pole. Upon passing radially outward through the first further inner circumference 1116, the flux then further proceeds radially outward through the first inner portion 1102 and the first outer portion 1104.

The first permanent magnet gear 1100 of FIG. 11 in the present embodiment can be considered a spur gear. As discussed in further detail below with respect to FIG. 12 and FIG. 13, the present disclosure is intended to encompass gear assemblies and systems employing multiple spur gears each taking the form of (and having the same polarity as) the first permanent magnet gear 1100, as well as gear assemblies employing multiple spur gears in which the different spur gears have different polarities (e.g., one having the same polarity as the first permanent magnet gear, and one having an opposite polarity). Also, notwithstanding the description provided herein in regard to FIG. 11, FIG. 12, and FIG. 13, the present disclosure is also intended to encompass other types of permanent magnet gear assemblies and systems employing other types of intermeshing gears, as well as other types of power transmission systems employing other corresponding interfacing structures, such as those described above, including gears with any of a variety of gear tooth profiles, bevel gears, rack and pinion assemblies, worm gears, screw and nut assemblies, etc.

Figure 12:
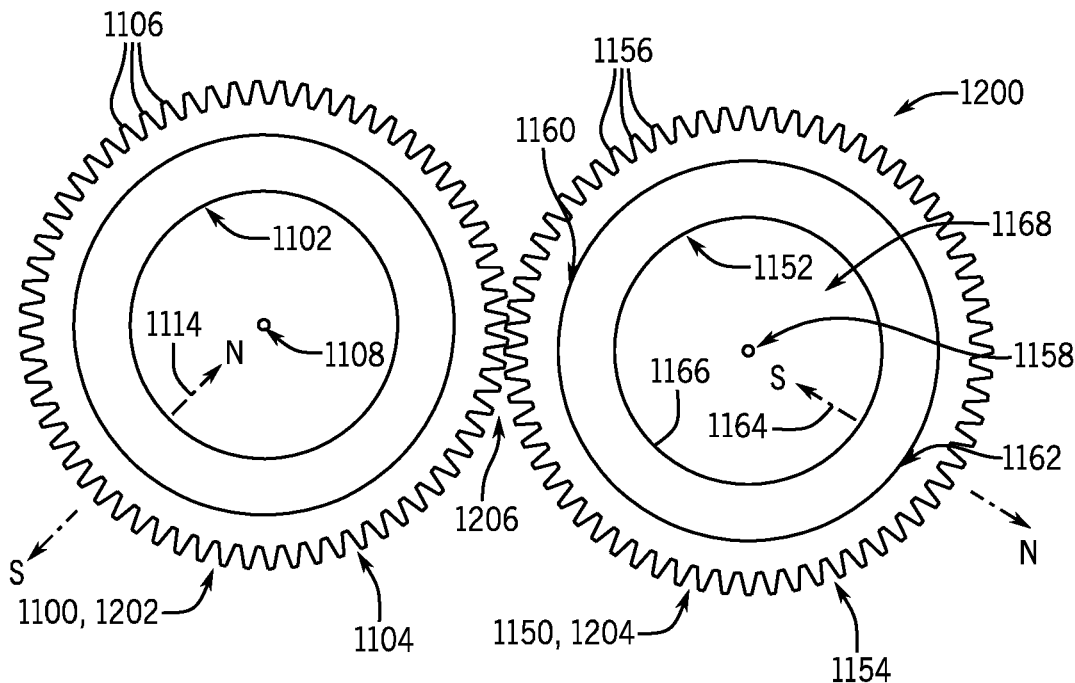
FIG. 12 is a side elevation view of a permanent magnet gear assembly with one gear having the form shown in FIG. 11 and a second gear having a form that is identical to that shown in FIG. 11 but with an opposite polarity, in which the gear assembly can be operated as part of a magnetically-assisted mechanical gear system, in accordance with an additional example embodiment encompassed herein.

Referring additionally to FIG. 12 in this regard, a first permanent magnet gear assembly 1200 has two interfacing gears, including a first gear that is a driving gear 1202 and a second gear that is a driven gear 1204. In this example of FIG. 12, the driving gear 1202 is a first spur gear taking the form of the first permanent magnet gear 1100 of FIG. 11. In contrast, the driven gear 1204 is a second spur gear but takes the form of a second permanent magnet gear 1150 that is identical to the first permanent magnet gear 1100 of FIG. 11 except insofar as has a polarity that is opposite to the polarity of the first permanent magnet gear. Thus, the second permanent magnet gear 1150 has a second inner portion 1152, a second outer portion 1154, a second outer gear teeth 1156, an outer circumference 1160, an inner circumference 1162, a second further inner circumference 1166, and a second interior region 1168, which respectively correspond to and are identical in shape to the first inner portion 1102, the first outer portion 1104, the first outer gear teeth 1106, the outer circumference 1110, the inner circumference 1112, the first further inner circumference 1116, and the first interior region 1118, respectively. Also, just as the first inner portion 1102 and first outer portion 1104 extend concentrically around a first central axis 1108, the second inner portion 1152 and second outer portion 1154 extend concentrically around a second central axis 1158.

Notwithstanding the similarities between the first permanent magnet gear 1100 and the second permanent magnet gear 1150, as noted the second permanent magnet 1150 has a polarity that is opposite the polarity of the first permanent magnet gear 1100. This is illustrated in FIG. 12 by a second radial axis represented by an arrow 1164, which is labeled in a manner opposite that of the arrow 1114. That is, in FIG. 12, although the arrow 1114 associated with the first permanent magnet gear 1100 is labeled to show the north pole as being positioned within the interior region 1118 and the south pole as being positioned along the first outer gear teeth 1106 of that gear, the arrow 1164 associated with the second permanent magnet gear 1150 is labeled to show the south pole as being positioned within the second interior region 1168 and the north pole as being positioned along the second outer gear teeth 1156 of that gear. In alternate embodiments, the respective polarities of the first and second permanent magnet gears 1100 and 1150 can be reversed from that shown in FIG. 12.

Because of the opposite polarities associated with the first permanent magnet gear 1100 and second permanent magnet gear 1150, attractive magnetic forces exist between those respective gears, particularly at contacting ones of the first outer gear teeth 1106 and second outer gear teeth 1156, which are collectively shown as intermeshing gear teeth 1206 in FIG. 12. In the present embodiment, the attractive magnetic forces at the intermeshing gear teeth 1206 can have the same or substantially similar effects as the attractive magnetic forces described above in regard to embodiments such as those shown in and described in regard to FIGS. 1 through 10. That is, the first outer gear teeth 1106 can contact and mechanically push the second outer gear teeth 1156 in the same manner that the driving gear teeth 106 can mechanically push the driven gear teeth 110 in the embodiment of FIG. 1.

Also, contacting ones of the first outer gear teeth 1106 and second outer gear teeth 1156 have stronger attractive magnetic forces therebetween than non-contacting ones of the first outer gear teeth 1106 and second outer gear teeth 1156, in the same manner that contacting ones of the driving gear teeth 106 and driven gear teeth 110 have stronger attractive magnetic forces therebetween than do non-contacting ones of the driving gear teeth 106 and driven gear teeth 110. Consequently, if the direction of rotation of the first permanent magnet gear 1100 is reversed, contact between the contacting ones of the first outer gear teeth 1106 and second outer gear teeth 1156 will be maintained, and occurrences of backlash movement will still be avoided or reduced, due to the attractive magnetic forces between those teeth (provided that those attractive magnetic forces are not overwhelmed by other countervailing forces, including mechanical or loading forces and/or other attractive magnetic forces between non-contacting ones of the first outer gear teeth 1106 and second outer gear teeth 1156). Indeed, in the same manner as described in regard to the gear assembly 100 of FIG. 1, upon a reversal of the direction of the first permanent magnet gear 1100, the first outer gear teeth 1106 of that gear will tend to pull the second outer gear teeth 1156 of the second permanent magnet gear 1150, until such time as the direction of rotation of the first permanent magnet gear 1100 is reversed again.

Figure 13:
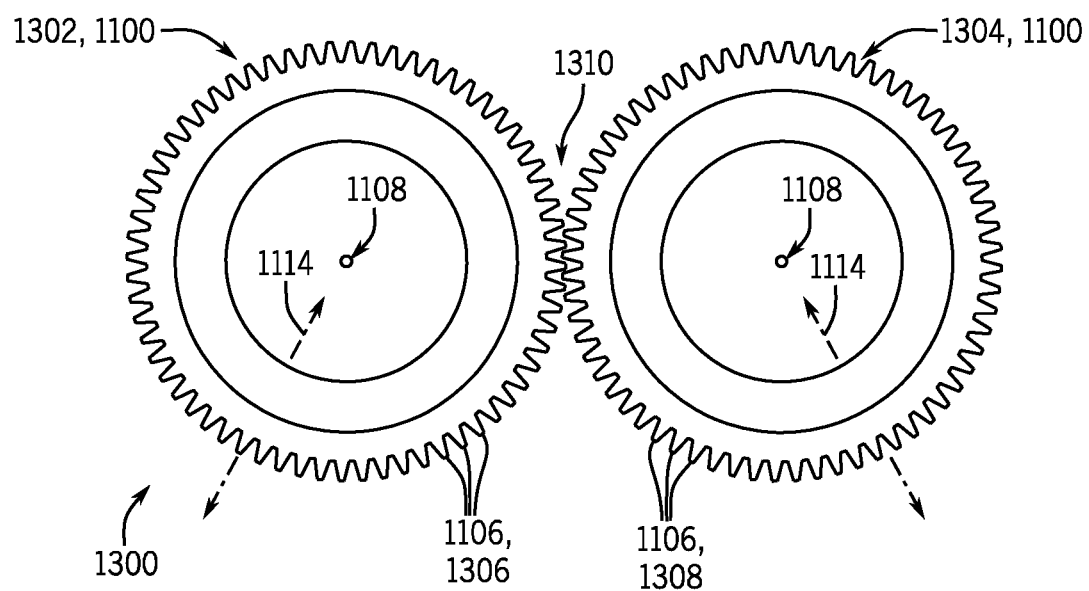
FIG. 13 is a side elevation view of a permanent magnet gear assembly with two gears each having the form shown in FIG. 11, in which the gear assembly can be operated as part of a magnetically-assisted mechanical gear system, in accordance with an additional example embodiment encompassed herein.

In addition to the embodiment of FIG. 12, the present disclosure also is intended to encompass additional permanent magnet gear assemblies that employ intermeshing gears that share in common the same polarity. In this regard, FIG. 13 shows a second permanent magnet gear assembly 1300 with two interfacing gears, including a first gear that is a driving gear 1302 and a second gear that is a driven gear 1304. In this embodiment, each of the driving gear 1302 and driven gear 1304 is a spur gear taking the form of the first permanent magnet gear 1100 of FIG. 11. Each of the driving gear 1302 and driven gear 1304 can be manufactured for example from the same radially oriented ring magnets, such that all of the gear teeth of both of the gears have the same polarity.

Thus, in contrast to the first permanent magnet gear assembly 1200, each of the driving gear 1302 and driven gear 1304 of the second permanent magnet gear assembly 1300 has the same polarity, namely, the polarity illustrated in FIG. 11 in which the north pole of the first permanent magnet gear 1100 is along the first interior region 1118 and the south pole of the gear is along the outer periphery of the first outer gear teeth 1106. Although in the present example each of the driving gear 1302 and driven gear 1304 has the polarity of the first permanent magnet gear 1100, in alternate embodiments each of the driving gear and driven gear can instead have the opposite polarity in which it is the south pole that is along the interior region and the north pole that is along outer gear teeth (as with the second permanent magnet gear 1150 of FIG. 12).

Because the driving gear 1302 and driven gear 1304 in the second permanent magnet gear assembly 1300 share in common the same polarity, the second permanent magnet gear assembly 1300 operates in a manner that is different than the first permanent magnet gear assembly 1200—indeed, the second permanent magnet gear assembly 1300 operates in a manner that also is different from the other embodiments discussed above in regard to FIGS. 1 through 10. In particular, because the driving gear 1302 and driven gear 1304 of the second permanent magnet gear assembly 1300 share in common the same polarity, repulsive magnetic forces exist between driving gear teeth 1306 of the driving gear 1302 and driven gear teeth 1308 of the driven gear 1304. These repulsive magnetic forces particularly are strongest at those of the driving gear teeth 1306 and driven gear teeth 1308 that are meshing with one another, which are shown as intermeshing gear teeth 1310 in FIG. 13. As a result of these repulsive magnetic forces, the driving gear teeth 1306 and driven gear teeth 1308 tend not to come into physical contact with one another.

Indeed, due to the repulsive forces between the intermeshing gear teeth 1310, as any given one of the driving gear teeth 1306 approaches a given one of the driven gear teeth 1308, that given one of the driven gear teeth 1308 will tend to be pushed away from the given one of the driving gear teeth 1306 simply by virtue of the repulsive magnetic forces existing between those teeth, without any physical contact or mechanical forces coming into play. This manner of operation is true regardless of the direction of rotation of the driving gear 1302. Thus, in this embodiment, in which the driving gear teeth 1306 and driven gear teeth 1308 that are meshed are all associated with the same magnetic pole, opposing forces can be used to transmit forces/torques without or substantially without physical contact, in a manner that prevents or reduces backlash movement. Backlash movement is avoided or at least reduced insofar as each given one of the driving gear teeth 1306, as it meshes with the driven gear teeth 1308 and regardless of the direction of rotation, tends to remain positioned substantially midway between the neighboring ones of the driven gear teeth on opposite sides of that given one of the driving gear teeth, and vice-versa.

At the same time, it should be noted that, depending upon other forces (e.g., the mechanical load borne by the driven gear 1304), it is not necessarily the case that any given one of the driving gear teeth 1306 will be positioned exactly midway in between the neighboring ones of the driven gear teeth 1308 on opposite sides of that driving gear tooth (or vice-versa) when those teeth are meshing with one another. Indeed, depending upon the forces (or torques) involved or other operational circumstances, any given one of the driving gear teeth 1306 that is meshing with a pair of the driven gear teeth 1308 may be closer to one or the other of those driven gear teeth, and likewise any given one of the driven gear teeth 1308 that is meshing with a pair of the driving gear teeth 1306 may be closer to one or the other of those driving gear teeth. Additionally, in the embodiment of FIG. 13, it is even possible that in some circumstances given ones of the driving gear teeth 1306 and driven gear teeth 1308 will physically come into contact with one another and communicate forces (and/or torques) between one another mechanically due to such contact. In view of this type of behavior, and given that the driving gear 1302 and driven gear 1304 retain the physical shape and structure (except for their magnetic properties) of other types of mechanical gears such as those described above in regard to FIG. 1, the second permanent magnet gear assembly 1300 can also be considered a magnetically-assisted mechanical gear assembly or system.

In addition to the embodiments described above in regard to each of FIGS. 1 through 13, the present disclosure is also intended to encompass numerous other embodiments. Among other things, although some of the embodiments described above employ electromagnetic MMF source(s) to generate magnetic flux and associated magnetic forces electromagnetically and others of the embodiments described above employ permanent magnet(s) as MMF source(s) to generate magnetic flux and associated magnetic forces, the present disclosure also encompasses embodiments in which the MMF source(s) that are employed include both one or more permanent magnet(s) and one or more electromagnetic source(s). In at least some such embodiments employing both permanent magnet(s) and electromagnetic source(s) in which the electromagnetic source(s) include one or more coil structures or elements, the current(s) flowing within the coil structures can be adjusted in sign and amplitude. Depending upon the embodiment or implementation, such current(s) flowing within the electric coil structures can be adjusted to selectively strengthen, reduce or cancel the magnetic flux (e.g., MMF) provided from the permanent magnet(s). This approach allows for a default, unpowered, anti-backlash torque handling ability, allows for conventional backlash operation when the current(s) within the coil structures are controlled to perfectly cancel the magnetic flux (MMF) provided from the permanent magnet(s), and also allows for increased anti-backlash torque handling when the current(s) are controlled to so that the magnetic flux generated electromagnetically is additive relative to the magnetic flux provided by the permanent magnet(s). Additionally, it should be appreciated that one or more additional sources of MMF can be applied to any of the circuits described herein, and that, indeed, any arbitrary number of sources of MMF can be employed depending upon the embodiment.

Also, notwithstanding the above description, the present disclosure is also intended to encompass a variety of other magnetically-assisted mechanical gear systems or assemblies, and other systems or assemblies with other corresponding interfacing structures allowing for power transmission (such as screw-and-nut assemblies with threads, worm gear assemblies, and rack and pinion assemblies, etc., as described above) that are configured to allow for the application of magnetic fields to and through interfacing gears and other structures to achieve power transmission operation. Such different magnetically-assisted mechanical gear systems and assemblies, and other related systems or assemblies, can vary from one another and from those described above in terms of any of a variety of structural features and/or in any of a variety of other manners. For example, any plurality of gears may be placed in series or parallel to produce a variety of arrangements driving flux in a circuit between pairs of gears. Any of a variety of types of gear arrangements and meshes are intended to be encompassed herein, including for example planetary arrangement gear meshes. Although in some embodiments, any given gear assembly can include two or more gears that have the same shape and size, in alternate embodiments, any given gear assembly can include two or more gears that respectively have different shapes and/or sizes, and/or different numbers of gear teeth, respectively, or gear teeth respectively having different shapes or profiles, respectively.

Additionally, although the present disclosure envision interfacing structures such as gears, racks, screws, and nuts, which include formations such as gear teeth and/or threads by which those interfacing structures can interact with and communicate forces/torques among each other, the present disclosure is not intended to be limited to the particular interfacing structures or formations descried above. Rather, the present disclosure is also intended to encompass other types of interfacing structures and/or interfacing structures that have other types of formations that can allow for mechanical and/or magnetic interactions and the communication of forces/torques. Further, the present disclosure is intended to encompass any of a variety of different embodiments having any one or more intermediary structures such as the hollow cylinders or other structures, as well as any number of air gaps or structures affecting reluctances or other aspects of the flow or communication of magnetic flux or achievement of magnetic forces, and is not limited to the particular embodiments described above.

Further, it should be recognized that whether a particular interfacing structure constitutes a driving gear (or other interfacing structure that serves to impart movement, force, or torque to another interfacing structure) or a driven gear (or other interfacing structure that serves to move, or receive applied force or torque from another interfacing structure) can vary with time for a given device or system, or can vary in dependence upon the manner of operation of a given device or system. That is, for a given device or system, it is possible that a gear (or other interfacing structure) that constitutes a driving gear (or other driving interfacing structure) at one moment in time or in one operational circumstance may serve as or become a driven gear (or other driven interfacing structure) at another moment in time or in another operational circumstance, or vice-versa. Such switching of the roles of interfacing gears (or other interfacing structures) between being driving gears (or other driving interfacing structures) and being driven gears (or other driven interfacing structures) can occur in any of a variety of types of implementations, arrangements, applications, or systems.

For example, in one system, a first gear can be driven to rotate by a motor at a first time so as to cause rotation of a second gear that in turn is coupled to a spring load. In such system, at the first time, the first gear constitutes the driving gear and the second gear constitutes the driven gear. However, also with respect to such a system, the first gear and second gear of the system can respectively switch in their respective roles to become the driven gear and driving gear of the system, respectively, if at a second time the motor is switched off. At such a second time, the spring coupled to the second gear will tend to drive the second gear to rotate (in a direction contrary to the direction in which the second gear was previously driven to rotate by the first gear), and the second gear in turn will tend to drive the first gear to rotate (in a direction contrary to the direction in which the first gear was previously caused to rotate by the motor). At that second time, the second gear constitutes the driving gear and the first gear constitutes the driven gear.

Thus, although the description provided herein includes descriptions of one or more embodiments in which a particular gear (or other interfacing structure) is referred to as a driving gear (or other driving interfacing structure) and in which a particular other gear (or other interfacing structure) is referred to as a driven gear (or other driven interfacing structure), such description should not be interpreted as implying that those particular gears (or other interfacing structures) necessarily always serve as driving and driven gears, respectively (or as driving and driven interfacing instructions, respectively). Rather, with respect to at least some embodiments encompassed herein, depending upon the implementation or operational circumstance, any given one of a pair of interfacing gears or structures of such embodiment can serve as the driving interfacing structure or the driven interfacing structure at different times or operational circumstances.

It should be appreciated that one or more embodiments described herein are capable of providing any one or more of a variety of advantages. For example, delays in movement or the transmission of power, which might otherwise arise due to backlash within a given conventional system, can be avoided, eliminated, or reduced in one or more of the embodiments encompassed herein that eliminate, avoid, or reduce backlash. Also for example, errors in output rotation relative to input rotation, which might otherwise arise due to backlash within a given conventional system, can be avoided, eliminated, or reduced in one or more of the embodiments encompassed herein that avoid, eliminate, or reduce backlash. Further, although unsteady rotation (e.g., output rotation) might produce overall system instability in a conventional system having backlash, one or more of the embodiments encompassed herein that avoid, eliminate, or reduce backlash can achieve operation that remains stable notwithstanding such unsteady rotation. In at least some such embodiments, such system stability can be achieved at least in part because, due to the absence of or reduction in backlash, details regarding the angular positions of the gears (or other gear train components or other interfacing components) of the system can be sensed/tracked and taken in another account at any given moment.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A magnetically-assisted mechanical power transmission system, the system comprising:
    a first component having first formations arranged along the first component;
    a second component having second formations arranged along the second component, wherein one of the first component and the second component is a first rotating component;
    a first magnetomotive force (MMF) source that generates a first magnetic flux, wherein the first MMF source either is at least indirectly supported in relation to, or is formed as part of, one or both of the first component and second component; and
    a magnetic circuit in which the first magnetic flux generated by the first MMF source is communicated via the first and second components, which provide first and second reluctances, respectively, and at least one of an additional structure or air gap that provides an additional reluctance,
    wherein the first component is in contact with or in proximity to the second component so that, in response to a first movement of the first component in a first direction, the second component is driven to undergo a second movement in a second direction,
    wherein at least a first portion of the first magnetic flux is communicated between at least one of the first formations of the first component and at least one of the second formations of the second component so that one or more magnetic forces are exerted between the first component and the second component, and
    wherein, when the first movement of the first component is changed from being in the first direction to being in a third direction opposite the first direction, then the second component is driven by the one or more magnetic forces so that the second movement is changed from being in the second direction to being in a fourth direction opposite the second direction,
    wherein a first amount of backlash movement between the first component and the second component is avoided or reduced due to the one or more magnetic forces.

2. The system of claim 1, wherein the first component is the first rotating component, and wherein the second component is a second rotating component.

3. The system of claim 2, wherein the first rotating component is a first gear, and wherein the second rotating component is a second gear.

4. The system of claim 3, wherein the first formations are first gear teeth of the first gear, and wherein the second formations are second gear teeth of the second gear.

5. The system of claim 4 wherein, when the first movement of the first component is changed from being in the first direction to being in the third direction opposite the first direction:
- a first surface portion of a first one of the first gear teeth of the first gear is mechanically contacting a first surface portion of a first one of the second gear teeth of the second gear and a gap exists between a second surface portion of the first one of the first gear teeth of the first gear and an additional surface portion of a successive one of the second gear teeth of the second gear, the successive one of the second gear teeth being positioned on an opposite side of the first one of the first gear teeth by comparison with the first one of the second gear teeth;
- a first portion of the magnetic flux passing between the first surface portion of the first one of the first gear teeth and the first surface portion of the first one of the second gear teeth is stronger than a second portion of the magnetic flux passing between the second surface portion of the first one of the first gear teeth and the additional surface portion of the successive one of the second gear teeth, so that a first attractive force between the first ones of the first and second gear teeth is stronger than a second attractive force between the first one of the first gear teeth and the successive one of the second gear teeth; and
- due to the first movement being changed, and due at least in part to the first attractive force, the first one of the first gear teeth pulls the first one of the second gear teeth in the fourth direction and the first one of the first gear teeth does not move sufficiently far toward the successive one of the second gear teeth so as to eliminate the gap, and thus the first amount of the backlash movement is avoided.

6. The system of claim 4, wherein each of the first gear and the second gear is a respective spur gear, and wherein each of the first gear teeth and each of the second gear teeth has a respective involute gear profile.

7. The system of claim 4, wherein each of the first gear teeth and each of the second gear teeth has a respective semi-involute gear profile according to which each respective tooth of the first gear teeth and second gear teeth has a respective first side having a respective involute gear profile contour and a respective second side having a respective alternate contour that is substantially closer to a respective radially-extending midline of the respective tooth than the respective involute gear profile contour of the respective first side.

8. The system of claim 4, further comprising a first shaft having a first central axis and a second shaft having a second central axis, wherein the first central axis and the second central axis are parallel or substantially parallel;
wherein the first gear is supported upon the first shaft and the second gear is supported upon the second shaft, wherein the first gear is aligned or substantially aligned with the second gear, and wherein each of the first gear and the second gear is a respective spur gear.

9. The system of claim 8, further comprising a first hollow cylinder supported upon the first shaft and a second hollow cylinder supported upon the second shaft, wherein the first hollow cylinder is aligned or substantially aligned with the second hollow cylinder,
wherein either the second hollow cylinder is adjacent to or proximate to the second gear, and the MMF source is also supported upon the first shaft and positioned between the first hollow cylinder and the first gear, or the first hollow cylinder is adjacent to or proximate to the first gear, and the MMF source is also supported upon the second shaft and positioned between the second hollow cylinder and the second gear.

10. The system of claim 9, further comprising a magnetic circuit, wherein a magnetic flux path within the magnetic circuit of the system extends from and back to the MMF source at least indirectly by way of each of the first and second hollow cylinders and each of the first and second gears, and further by way of an air gap between the first and second hollow cylinders.

11. The system of claim 8, further comprising a third gear supported upon the first shaft and a fourth gear supported upon the second shaft, wherein the third gear is aligned or substantially aligned with the fourth gear,
wherein either the fourth gear is adjacent to or proximate to the second gear, and the MMF source is also supported upon the first shaft and positioned between the third gear and the first gear, or the third gear is adjacent to or proximate to the first gear, and the MMF source is also supported upon the second shaft and positioned between the fourth gear and the second gear.

12. The system of claim 11, further comprising a magnetic circuit, wherein a magnetic flux path within the magnetic circuit of the system extends from and back to the MMF source at least indirectly by way of each of the first, second, third, and fourth gears.

13. The system of claim 4, wherein the first gear is a first spur gear that includes first permanent magnet material as the first MMF source so that the first gear has a first polarity in which a first pole having a first polarity is positioned at or proximate to the first gear teeth of the first gear and a second pole having a second polarity opposite the first polarity is positioned at or proximate to a first inner circumference of the first spur gear,
wherein the second gear is a second spur gear that includes second permanent magnet material as a second MMF source so that the second gear has a second polarity in which a third pole having the second polarity is positioned at or proximate to the second gear teeth of the second gear and a fourth pole having the first polarity is positioned at or proximate to a second inner circumference of the second spur gear, and
wherein, due to the first polarity and second polarity, attractive magnetic forces exist between the first gear teeth of the first gear and the second gear teeth of the second gear.

14. The system of claim 4, wherein the first gear is a first spur gear that includes first permanent magnet material as the first MMF source so that the first gear has a first polarity in which a first pole having a first polarity is positioned at or proximate to the first gear teeth of the first gear and a second pole having a second polarity opposite the first polarity is positioned at or proximate to a first inner circumference of the first spur gear.

15. The system of claim 14, wherein the second gear is a second spur gear that includes second permanent magnet material as a second MMF source so that the second gear has a second polarity in which a third pole having the first polarity is positioned at or proximate to the second gear teeth of the second gear and a fourth pole having the second polarity is positioned at or proximate to a second inner circumference of the second spur gear,
wherein, due to the first polarity and second polarity, repulsive magnetic forces exist between the first gear teeth of the first gear and the second gear teeth of the second gear.

16. The system of claim 3, further comprising a first shaft supporting the first gear and a second shaft supporting the second gear, wherein the first shaft extends perpendicularly or substantially perpendicularly relative to the second shaft.

17. The system of claim 16, wherein the first gear is a first bevel gear, and wherein the second gear is a second bevel gear.

18. The system of claim 17, further comprising a hollow cylinder supported upon either the first shaft or the second shaft, wherein either (1) if the hollow cylinder is supported upon the first shaft, the MMF source is supported upon the first shaft between the hollow cylinder and the first bevel gear and a first air gap separates the hollow cylinder at least indirectly from the second bevel gear, or (2) if the hollow cylinder is supported upon the second shaft, the MMF source is supported upon the second shaft between the hollow cylinder and the second bevel gear and a second air gap separates the hollow cylinder at least indirectly from the first bevel gear.

19. The system of claim 16, wherein the first gear and second gear form a worm gear assembly having a worm gear, wherein either the first gear or the second gear is the worm gear.

20. The system of claim 19, further comprising a flux-conducting structure that is either C-shaped or L-shaped, and that supports at least one of the first shaft and the second shaft,
wherein either (1) the MMF source is supported upon the first shaft between the first gear and the flux-conducting structure if the second gear is the worm gear, or (2) the MMF source is supported upon the second shaft between the second gear and the flux-conducting structure if the first gear is the worm gear, and,
wherein the flux-conducting structure has a bracket portion that extends toward or around the worm gear so that an air gap is formed between the bracket portion and the worm gear.

21. The system of claim 2, wherein the system includes each of a screw and a nut supported upon and extending around the screw, and wherein either the first rotating component is the screw and the second rotating component is the nut, or the first rotating component is the nut and the second rotating component is the screw.

22. The system of claim 21, further comprising a first hollow cylinder supported upon and extending around the screw, wherein the screw includes first threads extending around an outer surface of the screw, wherein the nut includes second threads arranged along an interior surface of the nut, and wherein the MMF source extends around the screw and is positioned between the first hollow cylinder and the first gear.

23. The system of claim 22 wherein, when the first movement of the first component is changed from being in the first direction to being in the third direction opposite the first direction:
a first surface portion of a first one of the first threads of the screw is mechanically contacting a first surface portion of a first one of the second threads of the nut, and a gap exists between a second surface portion of the first one of the second threads and an additional surface portion of a successive one of the first threads of the screw, the successive one of the first threads being positioned on an opposite side of the first one of the second threads by comparison with the first one of the first threads;
a first portion of the magnetic flux passing between the first surface portion of the first one of the first threads and the first surface portion of the first one of the second threads is stronger than a second portion of the magnetic flux passing between the second surface portion of the first one of the second threads and the additional surface portion of the successive one of the first threads, so that a first attractive force between the first surface portions of the first ones of the first and second threads is stronger than a second attractive force between the second surface portion of the first one of the second threads and the additional surface portion of the successive one of the first threads; and
due to the first movement being changed, and due at least in part to the first attractive force, the first surface portion of the first one of the first threads tends to pull the first surface portion of the first one of the second threads in the fourth direction, and the first one of the second threads does not move sufficiently far toward the successive one of the first threads so as to eliminate the gap, and thus the first amount of the backlash movement is avoided.

24. The system of claim 1, wherein the one of the first component and the second component that is the first rotating component is a pinion, wherein another of the first component and the second component is a rack, and wherein the pinion is supported upon a first shaft.

25. The system of claim 24, further comprising a hollow cylinder supported upon the first shaft adjacent to the pinion, and an extension that is part of, or coupled to, the rack,
wherein the MMF source is supported upon the extension and a first air gap separates the MMF source at least indirectly from hollow cylinder.

26. The system of claim 1, wherein the first MMF source includes an electromagnet.

27. The system of claim 26, further comprising a controller, wherein a current flow through the electromagnet is controllable by the controller so that the first magnetic flux and thus the first amount of the backlash movement between the first component and the second component that is avoided or reduced can also be varied.

28. The system of claim 1, wherein the MMF source includes at least one permanent magnet.

29. The system of claim 1,
wherein the first formations are arranged along an outer portion of the first component,
wherein the first MMF source is arranged relative to the first component so that magnetic flux lines proceed radially outward to the outer portion of the first component and beyond the first formations at all circumferential locations around the first component, and
wherein the first MMF source is at least indirectly supported in relation to, but is distinct from, both of the first and second components.

30. A method of assembling the system of claim 1, wherein the method includes providing a component that at least partly determines the air gap via which the magnetic flux is communicated as the magnetic flux proceeds through the magnetic circuit from and back to the first MMF source.

31. A magnetically-assisted mechanical gear system, the system comprising:
a driving gear having driving gear teeth;
a driven gear having driven gear teeth;
a first magnetomotive force (MMF) source that generates a first magnetic flux, wherein the first MMF source is at least indirectly supported in relation to, or is formed as part of, one or both of the driving and driven gears; and a magnetic circuit in which the first magnetic flux generated by the first MMF source is communicated via the driving gear and the driven gear, which provide first and second reluctances, respectively, and at least one of an additional structure or air gap that provides an additional reluctance, wherein the driving gear and driven gear are arranged so that the driving gear teeth mesh with the driven gear teeth such that, in response to a first rotational movement of the driving gear in a first direction, the driven gear is driven to experience a second rotational movement in a second rotational direction, wherein at least a first portion of the first magnetic flux is communicated between at least one of the driving gear teeth and at least one of the driven gear teeth so that one or more magnetic forces are exerted between the driving and driven gears, and wherein, when the first rotational movement of the driving gear alternates from being in the first rotational direction to being in a third rotational direction opposite the first rotational direction, then the driven gear is driven by the one or more magnetic forces so that the second rotational movement also alternates from being in the second rotational direction to being in a fourth rotational direction opposite the second rotational direction, wherein a first amount of backlash movement between the driving and driven gears is avoided or reduced due to the one or more magnetic forces.

32. The system of claim 31, further comprising a controller, wherein the first MMF source is an electromagnet and the controller operates to govern a current flow through the electromagnet, and wherein the first magnetic flux and thus the first amount of backlash movement between the driving and driven gears can be varied in accordance with the current flow governed by the controller.

33. The system of claim 31 wherein, when the first movement of the driving gear is changed from being in the first rotational direction to being in the third rotational direction opposite the first rotational direction:

a first surface portion of a first one of the driving gear teeth of the driving gear is mechanically contacting a first surface portion of a first one of the driven gear teeth of the driven gear and a gap exists between a second surface portion of the first one of the driving gear teeth of the driving gear and an additional surface portion of a successive one of the driven gear teeth of the driven gear, the successive one of the driven gear teeth being positioned on an opposite side of the first one of the driving gear teeth by comparison with the first one of the driven gear teeth;

a first portion of the magnetic flux passing between the first surface portion of the first one of the driving gear teeth and the first surface portion of the first one of the driven gear teeth is stronger than a second portion of the magnetic flux passing between the second surface portion of the first one of the driving gear teeth and the additional surface portion of the successive one of the driven gear teeth, so that a first attractive force between the first ones of the driving and driven gear teeth is stronger than a second attractive force between the first one of the driving gear teeth and the successive one of the driven gear teeth; and due to the first movement being changed, and due at least in part to the first attractive force, the first one of the driving gear teeth pulls the first one of the driven gear teeth in the fourth direction and the first one of the driving gear teeth does not move sufficiently far toward the successive one of the driven gear teeth so as to eliminate the gap, and thus the first amount of the backlash movement is avoided.

34. The system of claim 31, wherein each of the driving gear and the driven gear is selected from the group consisting of a spur gear, a bevel gear, and a worm gear.

35. The system of claim 31, wherein the first MMF source includes at least one permanent magnet.

36. The system of claim 35, wherein the at least one permanent magnet is included in one or both of the driving gear and the driven gear.

37. A method of transmitting mechanical power in a magnetically-assisted manner, the method comprising:

providing a transmission system including
a first component having first formations,
a second component having second formations; and
a magnetomotive force (MMF) source that either is supported at least
indirectly in relation to, or is formed as part of, the first and second components;

generating a first magnetic flux by way of the first MMF source, wherein the first magnetic flux generated by the first MMF source is communicated in a magnetic circuit via the first and second components, which provide first and second reluctances, respectively, and at least one of an additional structure or air gap that provides an additional reluctance, and wherein the magnetic flux is communicated between at least one of the first formations of the first component and at least one of the second formations of the second component so that one or more magnetic forces are exerted between the first component and the second component;

moving the first component in a first direction so as to mechanically force the second component to move in a second direction due to mechanical contacts between first surfaces of the first formations, respectively, and first surfaces of the second formations, respectively; and moving the first component in a third direction opposite to the first direction wherein, when the first component is moved in the third direction, then the second component is driven by the one or more magnetic forces so that further movement of the second component is in a fourth direction opposite the second direction, wherein a first amount of backlash movement between the first component and the second component is avoided or reduced due to the one or more magnetic forces.

38. The method of claim 37, wherein the first component is a first gear, the first formations are first gear teeth or first threads, the second component is a second gear, and the second formations are second gear teeth or second threads.

39. The method of claim 38, further comprising controlling, by way of a controller, a current flow through an electromagnet that constitutes the first MMF source, wherein the current flow governs the one or more magnetic forces and thus the first amount of backlash movement.

40. The method of claim 39, wherein the one or more magnetic forces include either attractive forces or repulsive forces.

* * * * *